United States Patent
Koo et al.

(10) Patent No.: US 11,366,068 B2
(45) Date of Patent: Jun. 21, 2022

(54) INSPECTION APPARATUS AND OPERATING METHOD THEREOF

(71) Applicant: KOH YOUNG TECHNOLOGY INC., Seoul (KR)

(72) Inventors: Dae Sung Koo, Gwangmyeong-si (KR); Yong Kim, Seoul (KR); Ki Won Park, Gwangmyeong-si (KR); Yong Kim, Seoul (KR); Seo Jeong Jang, Gwangju (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 331 days.

(21) Appl. No.: 16/713,886

(22) Filed: Dec. 13, 2019

(65) Prior Publication Data
US 2020/0116651 A1 Apr. 16, 2020

Related U.S. Application Data

(63) Continuation-in-part of application No. 16/349,802, filed as application No. PCT/KR2017/012408 on Nov. 3, 2017, now Pat. No. 11,199,503.

(30) Foreign Application Priority Data

Nov. 14, 2016 (KR) .................... 10-2016-0151400

(51) Int. Cl.
*G01N 21/88* (2006.01)

(52) U.S. Cl.
CPC . *G01N 21/8851* (2013.01); *G01N 2021/8887* (2013.01)

(58) Field of Classification Search
CPC ....... G01N 21/8851; G01N 2021/8854; G01N 2035/0091; G01N 2021/8887
See application file for complete search history.

(56) References Cited

U.S. PATENT DOCUMENTS

| 5,555,316 A | 9/1996 | Tsujikawa et al. |
| 6,825,856 B1 | 11/2004 | Fazzio et al. |

(Continued)

FOREIGN PATENT DOCUMENTS

| EP | 1 264 221 | 8/2005 |
| JP | 11-258180 | 9/1999 |

(Continued)

OTHER PUBLICATIONS

D. Breitgand, M. Goldstein, E. Henis and O. Shehory, "Performance management via adaptive thresholds with separate control of false positive and false negative errors," 2009 IFIP/IEEE International Symposium on Integrated Network Management, 2009, pp. 195-202, doi: 10.1109/INM.2009.5188810 (Year: 2009).*

(Continued)

*Primary Examiner* — Michael Robert Cammarata
(74) *Attorney, Agent, or Firm* — Kile Park Reed & Houtteman PLLC

(57) ABSTRACT

According to the disclosure, an inspection apparatus determines whether a defect has occurred in a plurality of first inspection objects by comparing a reference range with the measurement value of the plurality of first inspection objects, identifies a plurality of second inspection objects in which a first error has occurred, and a plurality of third inspection objects in which a second error has occurred based on a result of determination whether the defect has occurred, adjusts the reference range based on measurement values of the plurality of second and third inspection objects, determines at least one of an occurrence probability of the first error and the second error based on the adjusted reference range, and displays at least one of a graph indicating the result of determination whether the defect has occurred, the adjusted reference range, the determined occurrence probability of the first error and the second error.

16 Claims, 16 Drawing Sheets

(56) References Cited

U.S. PATENT DOCUMENTS

| | | | |
|---|---|---|---|
| 8,224,605 B2 * | 7/2012 | Tasaki | H05K 13/083 |
| | | | 702/83 |
| 9,091,668 B2 | 7/2015 | Hong et al. | |
| 9,124,810 B2 * | 9/2015 | You | H04N 5/2351 |
| 11,199,503 B2 * | 12/2021 | Koo | G01N 21/8851 |
| 2002/0009220 A1 | 1/2002 | Tanaka | |
| 2003/0083756 A1 | 5/2003 | Hsiung et al. | |
| 2005/0019946 A1 | 1/2005 | Tuchman et al. | |
| 2005/0246045 A1 | 11/2005 | Sugihara et al. | |
| 2005/0273720 A1 * | 12/2005 | Cochran | G05B 19/41875 |
| | | | 715/751 |
| 2006/0115143 A1 * | 6/2006 | Auerbach | G01N 21/95607 |
| | | | 382/149 |
| 2006/0271226 A1 * | 11/2006 | Tasaki | G05B 19/41875 |
| | | | 700/109 |
| 2007/0005266 A1 | 1/2007 | Blevins et al. | |
| 2009/0073440 A1 * | 3/2009 | Tiemeyer | G01N 21/9501 |
| | | | 356/338 |
| 2010/0004875 A1 * | 1/2010 | Urano | G01N 21/4738 |
| | | | 702/40 |
| 2012/0185221 A1 * | 7/2012 | Mori | H05K 13/083 |
| | | | 703/2 |
| 2013/0279795 A1 | 10/2013 | Shlain et al. | |
| 2014/0198974 A1 * | 7/2014 | Takagi | H01L 22/12 |
| | | | 382/149 |
| 2015/0227139 A1 | 8/2015 | Yamamoto et al. | |
| 2016/0189055 A1 | 6/2016 | Zvitia | |
| 2018/0284739 A1 * | 10/2018 | Ueda | G06F 17/18 |
| 2019/0094155 A1 | 3/2019 | Honda et al. | |
| 2019/0376906 A1 * | 12/2019 | Koo | G01N 21/8851 |
| 2020/0057003 A1 | 2/2020 | Honda et al. | |
| 2020/0116651 A1 | 4/2020 | Koo et al. | |
| 2021/0247324 A1 | 8/2021 | Naruse | |

FOREIGN PATENT DOCUMENTS

| | | |
|---|---|---|
| JP | 2001-183307 | 7/2001 |
| JP | 2002139458 A * | 5/2002 |
| JP | 2004257845 A * | 9/2004 |
| JP | 2006-317266 | 11/2006 |
| JP | 2010-230452 | 10/2010 |
| JP | 2012-127973 | 7/2012 |
| JP | 2012-151251 | 8/2012 |
| JP | 2013-108798 | 6/2013 |
| KR | 20190057221 A * | 5/2019 |
| KR | 102290182 B1 * | 8/2021 |
| WO | 2017/168507 | 10/2017 |
| WO | 2017/168630 | 10/2017 |

OTHER PUBLICATIONS

D. Breitgand, Ealan Henis and Onn Shehory, "Automated and Adaptive Threshold Setting: Enabling Technology for Autonomy and Self-Management," Second International Conference on Autonomic Computing (ICAC'05), 2005, pp. 204-215, doi: 10.1109/ICAC.2005.11 (Year: 2005).*

Japanese Office Action, with English translation, corresponding to Japanese Patent Application No. 2019-525739, dated Feb. 24, 2021.

Chinese Office Action, with English translation, corresponding to Chinese Application No. or Publication No. 201780070386.5, dated Mar. 24, 2021.

International Search Report for International Application No. PCT/KR2017/012408, dated Jun. 28, 2018.

Korean Office Action with English translation for Korean Application No. 10-2016-0151400, dated, Jun. 25, 2018.

Korean Notice of Final Rejection with English translation for Korean Application No. 10-2016-0151400, dated Feb. 1, 2019.

Written Opinion with English translation for International Application No. PCT/KR2017/012408, dated Jun. 28, 2018.

Korean Office Action with English translation corresponding to Korean Application No. 10-2019-0057238, dated May 27, 2019.

Extended European Search Report, corresponding to European Application No./Patent No. 17869347.9, dated Jun. 15, 2020.

Japanese Office Action, with English translation, corresponding to Japanese Patent Application No. 2019-525739, dated Jul. 7, 2020.

Korean Office Action, with English translation, corresponding to Application No. 10-2020-0006453, dated Feb. 6, 2020.

Stefan Biffl et al.; "Evaluation the Accuracy of Defect Estimation Models Based on Inspection Data From Two Inspection Cycles"; Proceedings of the 23rd International Conference on Software Engineering. ICSE 2001, 2001, pp. 145-154.

René Heideklang et al.; Decision-Level Fusion of Spatially Scattered Multi-Modal Data for Nondestructive nspection of Surface Defects; Sensors, 2016, 105; pp. 1-21 Sensors (Basel). 2016;16(1):105. Published Jan. 15, 2016.

Hui-Fuang Ng; "Automatic Thresholding for Defect Detection"; IEEE Computer Society; Proceedings of the Third International Conference on Image and Graphics (ICIG'04); 2004, pp. 532-535.

Extended European Search Report, corresponding to European Application No. /Patent No. 21196822.7, dated Jan. 21, 2022.

* cited by examiner

| Inspection object ID | Inspection target | Measurement target | Measurement value (mm) | Error value (mm) | Result of determination whether defect has occurred | Result of determination review |
|---|---|---|---|---|---|---|
| 1 | Pad 1 | Width | 9.6 | 0.4 | Good(warning) | – |
| 1 | Pad 1 | Length | 9.7 | 0.3 | Good | – |
| 2 | Pad 1 | Width | 8.8 | 1.2 | Defective | – |
| 2 | Pad 1 | Length | 10.1 | 0.1 | Good | – |
| ... | ... | ... | ... | ... | ... | ... |
| 459 | Pad 1 | Width | 9.4 | 0.6 | Defective | False call |
| 460 | Pad 1 | Length | 10.5 | 0.5 | Good | Escape |

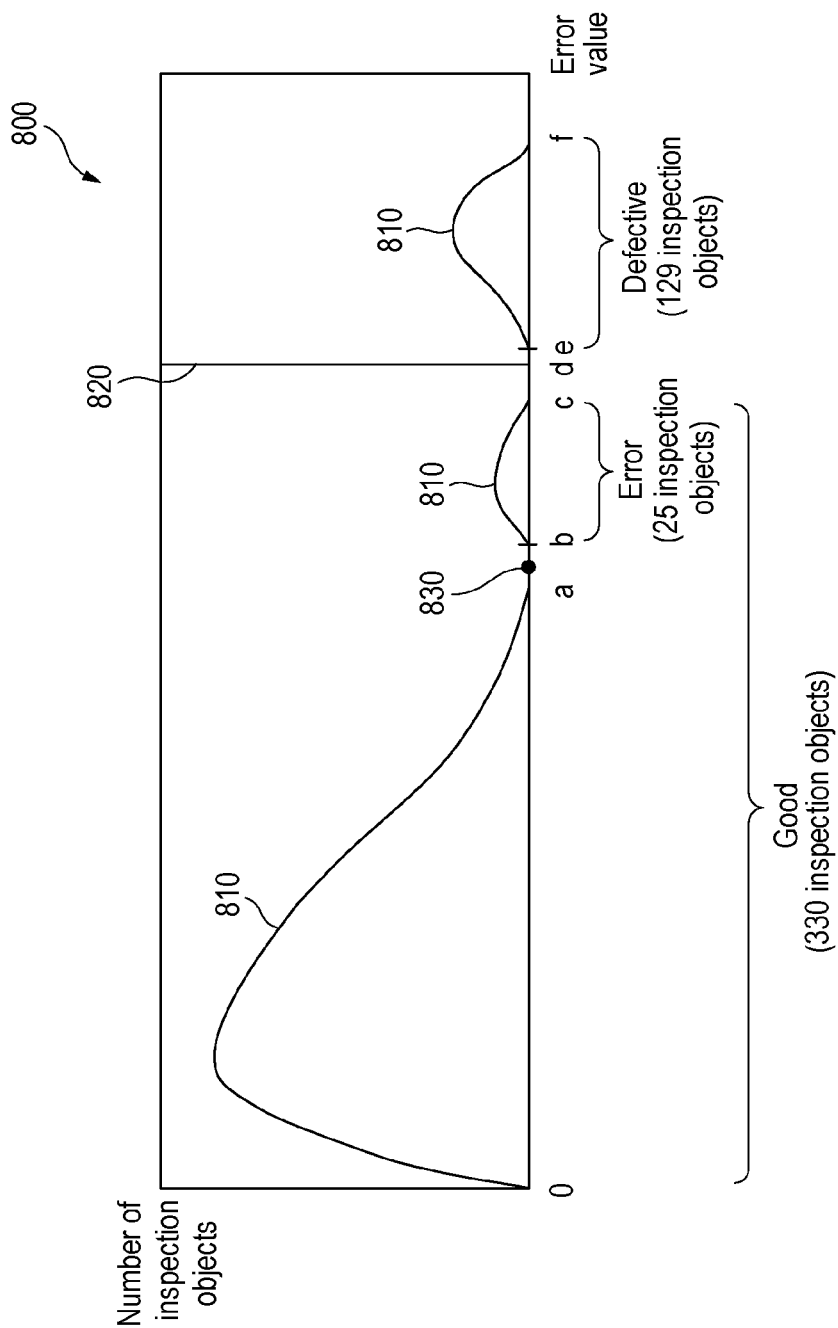

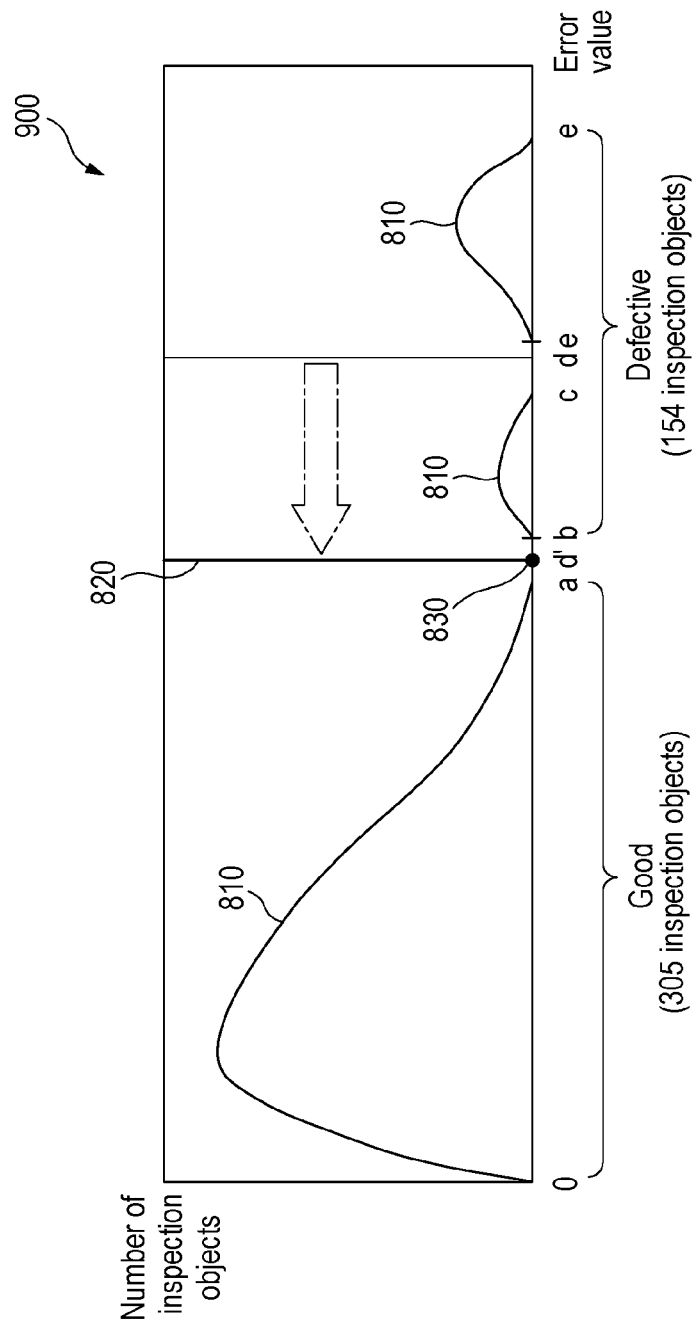

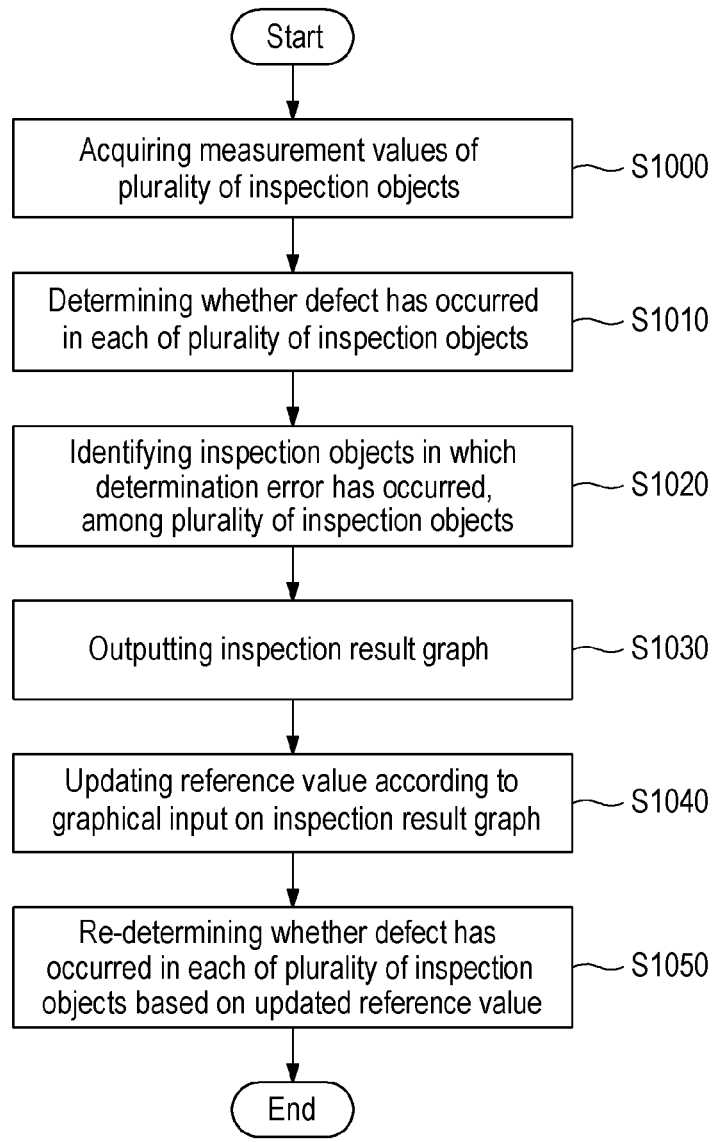

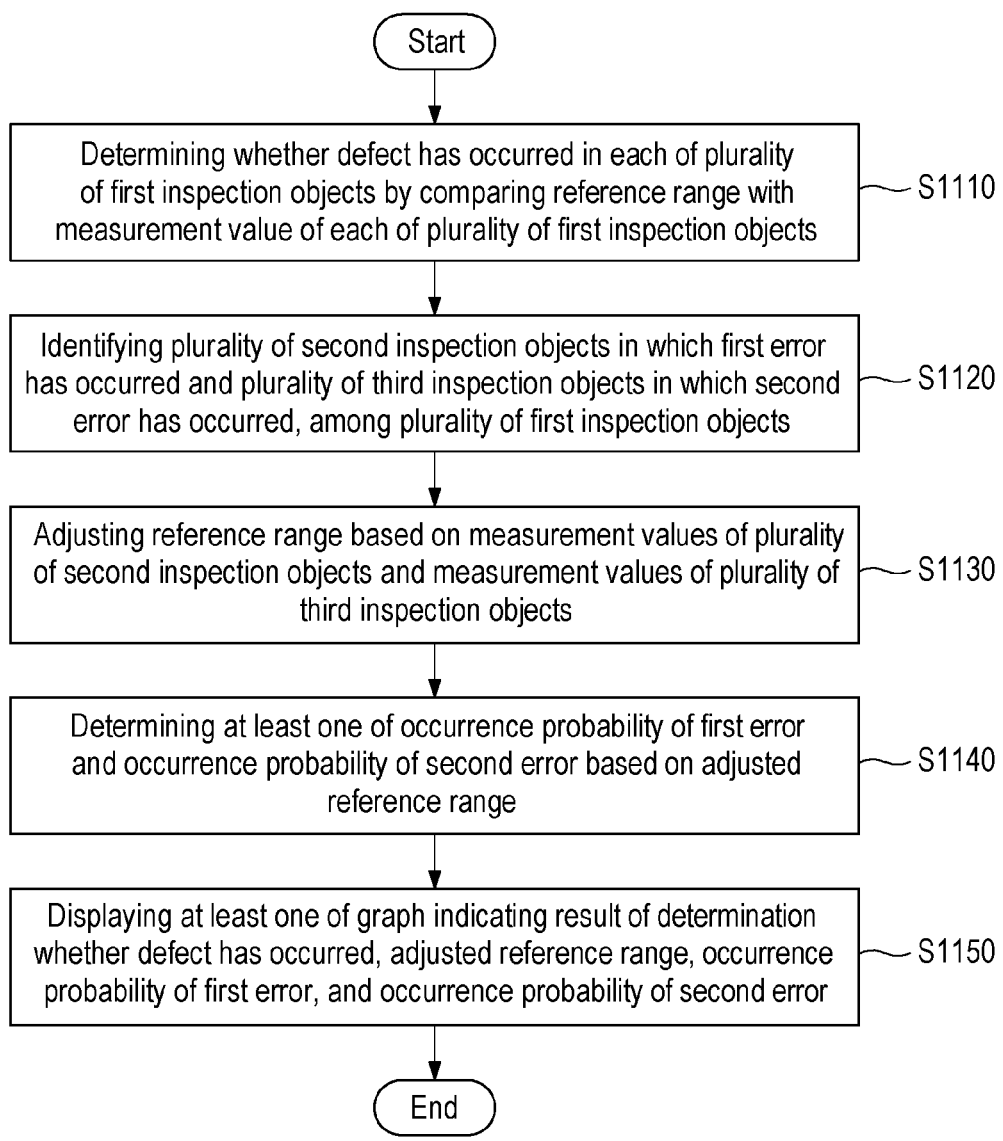

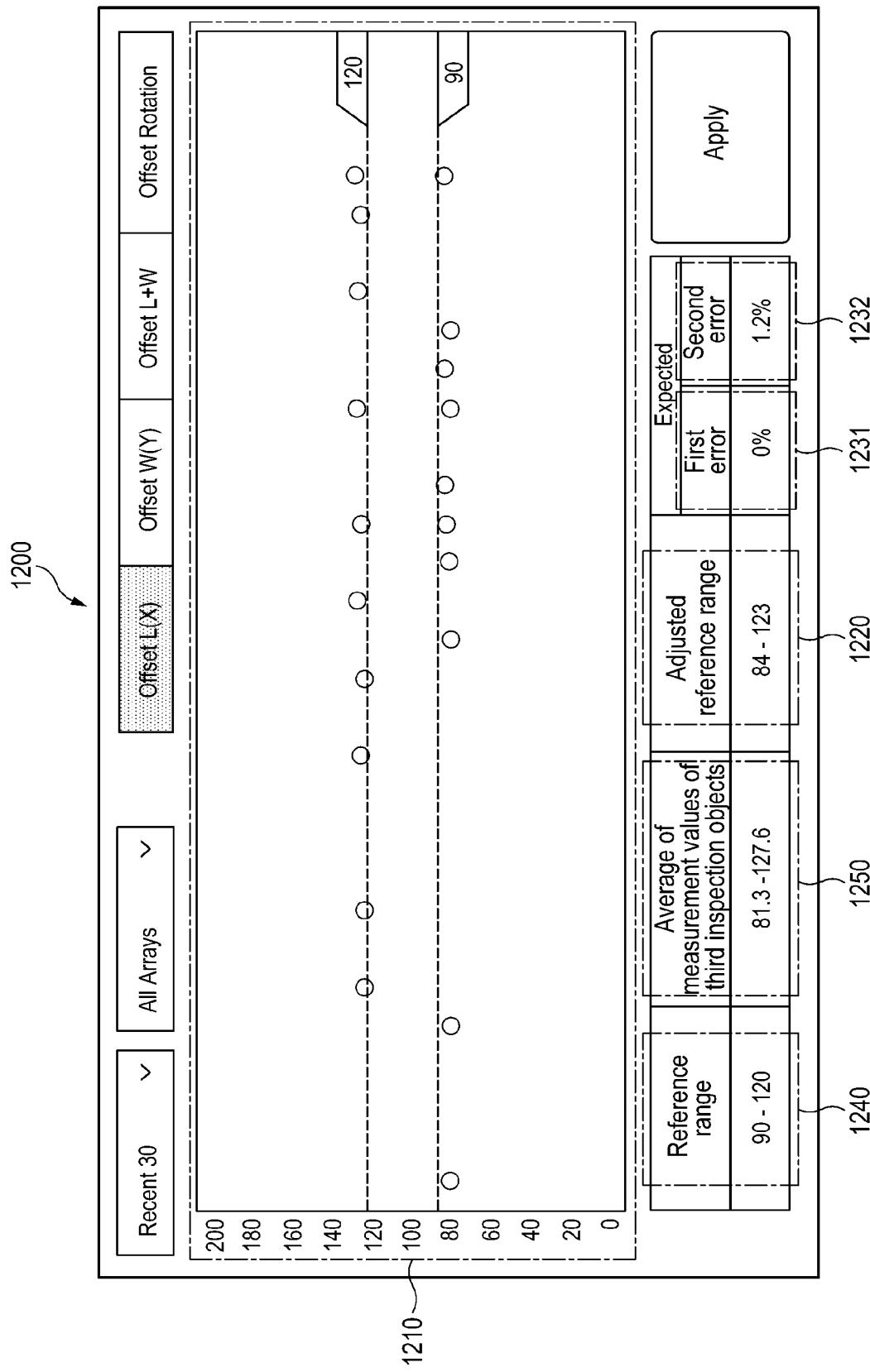

INSPECTION APPARATUS AND OPERATING METHOD THEREOF

CROSS-REFERENCE TO RELATED APPLICATIONS

This is a continuation-in-part application of pending U.S. patent application Ser. No. 16/349,802, filed on May 14, 2019, the disclosure of which is incorporated herein by reference in its entirety. U.S. patent application Ser. No. 16/349,802 is a national stage filing under 35 U.S.C. 371 of International Application No. PCT/KR2017/012408, filed on Nov. 3, 2017, which claims priority to Korean Patent Application No. 10-2016-0151400 filed on Nov. 14, 2016 in the Korean Intellectual Property Office, the disclosure of which are incorporated herein in its entirety for all purposes.

TECHNICAL FIELD

The present disclosure relates to a method and a device for adjusting a condition for determining a quality of an inspection object.

BACKGROUND

Manufacturers are making efforts to remove defective products during the production, assembly, intermediate process, and final assembly process. In such processes, manufacturers determine a quality of the product (that is, determine whether the product is good or defective (or no-good: NG) using various kinds of inspection systems.

According to an embodiment, an inspection system may measure the structure of an inspection object and determine whether the measurement values are within a predetermined reference range, thereby determining whether the corresponding inspection object is defective. For example, the inspection system irradiates an inspection object with light and receives light reflected from the inspection object, thereby acquiring image data of the inspection object. In addition, the inspection system acquires measurement values of the inspection object based on the acquired image data and derives an inspection result indicating whether the inspection object is defective based on the measurement values and the predetermined reference range.

The inspection result derived by the inspection system may include a determination error in which an inspection object that actually has no defect is determined to be a defective inspection object (False Call) or in which an inspection object that actually has a defect is determined to be a good inspection object (Escape). To remove such determination error, the reference range used for determining whether a defect has occurred may be modified. However, existing inspection systems just display the measurement values of the inspection object in numbers on a display unit, and a user often inputs the reference range directly as well. Accordingly, there was a problem in that, if the user desires to change the reference range, the user should check the measurement values displayed on the display unit to input the reference range as a new value every time.

SUMMARY

The disclosure provides an inspection apparatus that adjusts a reference range using a result of determining whether a defect has occurred and displays an occurrence probability of error according to the adjusted reference range and an operating method of the inspection apparatus.

One aspect of the present disclosure provides an inspection apparatus comprising a memory configured to store a measurement value of each of a plurality of first inspection objects, a display and a processor. The processor determines whether a defect has occurred in each of a plurality of first inspection objects by comparing a reference range set for determining whether a defect has occurred for an inspection object with the measurement value of each of the plurality of first inspection objects stored in the memory, identifies a plurality of second inspection objects, in which a first error has occurred, and a plurality of third inspection objects, in which a second error has occurred, among the plurality of first inspection objects based on a result of determination whether the defect has occurred in each of the plurality of the first inspection objects, the first error occurring by determining that a defect has not occurred in an inspection object having a defect and the second error occurring by determining that a defect has occurred in an inspection object having no defect, adjusts the reference range based on measurement values of the plurality of second inspection objects and measurement values of the plurality of third inspection objects, determines at least one of an occurrence probability of the first error and an occurrence probability of the second error based on the adjusted reference range, and displays, on the display, at least one of a graph indicating the result of determination whether the defect has occurred in each of the plurality of the first inspection objects, the adjusted reference range, the determined occurrence probability of the first error, and the determined occurrence probability of the second error.

According to at least one embodiment of the present disclosure, the processor determines that the defect has not occurred in at least one inspection object of which the measurement value is within the reference range, among the plurality of first inspection objects, and determines that the defect has occurred in at least one inspection object of which the measurement value is out of the reference range, among the plurality of first inspection objects.

According to at least one embodiment of the present disclosure, the processor adjusts at least one of an upper limit value and a lower limit value of the reference range to determine that the defect has occurred in at least one second inspection object among the plurality of second inspection objects.

According to at least one embodiment of the present disclosure, the processor identifies at least one fourth inspection object, of which the measurement value is less than the lower limit value of the reference range, among the plurality of third inspection objects, when only the upper limit value of the reference range is adjusted to determine that the defect has occurred in the at least one second inspection object, determines whether a median value of the at least one fourth inspection object is included in the reference range, in which only the upper limit value is adjusted, and adjusts the lower limit value of the reference range so that the median value of the at least one fourth inspection object is included in the reference range, when the median value of the at least one fourth inspection object is not included in the reference range, in which only the upper limit value is adjusted.

According to at least one embodiment of the present disclosure, the processor identifies at least one fifth inspection object, of which the measurement value exceeds the upper limit value of the reference range, among the plurality of third inspection objects, when only the lower limit value of the reference range is adjusted to determine that the defect has occurred in the at least one second inspection object, determines whether a median value of the at least one fifth inspection object is included in the reference range, in which only the lower limit value is adjusted, and adjusts the upper limit value of the reference range so that the median value of the at least one fifth inspection object is included in the reference range, when the median value of the at least one fifth inspection object is not included in the reference range, in which only the lower limit value is adjusted.

According to at least one embodiment of the present disclosure, the processor determines whether at least one sixth inspection object, of which the measurement value is within the adjusted reference range, among the plurality of second inspection objects exists, determines that there is no occurrence probability of the first error, when the at least one sixth inspection object does not exist, and determines the occurrence probability of the first error based on the number of the at least one sixth inspection object, when the at least one sixth inspection object exists.

According to at least one embodiment of the present disclosure, the processor determines whether at least one seventh inspection object, of which the measurement value is out of the adjusted reference range, among the plurality of third inspection objects exists, determines that there is no occurrence probability of the second error, when the at least one seventh inspection object does not exist, and determines the occurrence probability of the second error based on the number of the at least one seventh inspection object, when the at least one seventh inspection object exists.

According to at least one embodiment of the present disclosure, the processor applies the adjusted reference range for determining whether the defect has occurred for an inspection object, when a user input requesting application of the adjusted reference range is received.

One aspect of the present disclosure provides an operating method of an inspection apparatus comprising determining whether a defect has occurred in each of a plurality of first inspection objects by comparing a reference range set for determining whether a defect has occurred for an inspection object with a measurement value of each of the plurality of first inspection objects, identifying a plurality of second inspection objects, in which a first error has occurred, and a plurality of third inspection objects, in which a second error has occurred, among the plurality of first inspection objects based on a result of determination whether the defect has occurred in each of the plurality of the first inspection objects, the first error occurring by determining that a defect has not occurred in an inspection object having a defect and the second error occurring by determining that a defect has occurred in an inspection object having no defect, adjusting the reference range based on measurement values of the plurality of second inspection objects and measurement values of the plurality of third inspection objects, determining at least one of an occurrence probability of the first error and an occurrence probability of the second error based on the adjusted reference range and displaying at least one of a graph indicating the result of determination whether the defect has occurred in each of the plurality of the first inspection objects, the adjusted reference range, the occurrence probability of the first error, and the occurrence probability of the second error.

According to at least one embodiment of the present disclosure, the determining whether the defect has occurred in each of the plurality of first inspection objects comprises determining that the defect has not occurred in at least one inspection object, of which the measurement value is within the reference range, among the plurality of first inspection objects, and determining that the defect has occurred in at least one inspection object, of which the measurement value is out of the reference range, among the plurality of first inspection objects.

According to at least one embodiment of the present disclosure, the adjusting the reference range comprises adjusting at least one of an upper limit value and a lower limit value of the reference range to determine that the defect has occurred in at least one second inspection object among the plurality of second inspection objects.

According to at least one embodiment of the present disclosure, the adjusting the reference range comprises identifying at least one fourth inspection object of which the measurement value is less than the lower limit value of the reference range among the plurality of third inspection objects, when only the upper limit value of the reference range is adjusted to determine that the defect has occurred in the at least one second inspection object, determining whether a median value of the at least one fourth inspection object is included in the reference range, in which only the upper limit value is adjusted, and adjusting the lower limit value of the reference range so that the median value of the at least one fourth inspection object is included in the reference range, when the median value of the at least one fourth inspection object is not included in the reference range, in which only the upper limit value is adjusted According to at least one embodiment of the present disclosure, the adjusting the reference range comprises identifying at least one fifth inspection object, of which the measurement value exceeds the upper limit value of the reference range, among the plurality of third inspection objects, when only the lower limit value of the reference range is adjusted to determine that the defect has occurred in the at least one second inspection object, determining whether a median value of the at least one fifth inspection object is included in the reference range, in which only the lower limit value is adjusted, and adjusting the upper limit value of the reference range so that the median value of the at least one fifth inspection object is included in the reference range, when the median value of the at least one fifth inspection object is not included in the reference range, in which only the lower limit value is adjusted.

According to at least one embodiment of the present disclosure, the determining at least one of the occurrence probability of the first error and the occurrence probability of the second error comprises determining whether at least one sixth inspection object, of which the measurement value is within the adjusted reference range, among the plurality of second inspection objects exists, determining that there is no occurrence probability of the first error, when the at least one sixth inspection object does not exist, and determining the occurrence probability of the first error based on the number of the at least one sixth inspection object, when the at least one sixth inspection object exists.

According to at least one embodiment of the present disclosure, the determining at least one of the occurrence probability of the first error and the occurrence probability of the second error comprises determining whether at least one seventh inspection object, of which the measurement value is out of the adjusted reference range, among the plurality of third inspection objects exists, determining that there is no occurrence probability of the second error when the at least one seventh inspection object does not exist, and determining the occurrence probability of the second error based on the number of the at least one seventh inspection object, when the at least one seventh inspection object exists.

According to at least one embodiment of the present disclosure, the method further comprises applying the adjusted reference range for determining whether the defect has occurred for an inspection object, when a user input requesting application of the adjusted reference range is received.

The inspection apparatus according to various embodiments of the disclosure may identify a plurality of inspection objects in which a determination error has occurred based on a result of determining whether a defect has occurred in a plurality of first inspection objects, and may adjust a reference range based on measurement values of a plurality of inspection objects, in which a determination error has occurred. In addition, the inspection apparatus may display an occurrence probability of error according to the adjusted reference range. Through this, a user can easily recognize how much the reference range should be adjusted, and the inconvenience of adjusting the reference range one by one can be improved.

BRIEF DESCRIPTION OF DRAWINGS

FIG. 8 is a view illustrating an inspection result graph indicating a result of a quality determination and a review result of the quality determination according to an embodiment of the present disclosure.

FIG. 9 is a view illustrating an inspection result graph in which a reference value is updated according to an embodiment of the present disclosure.

FIG. 10 is a flowchart illustrating a method for adjusting a condition for determining a quality of inspection objects according to an embodiment of the present disclosure.

FIG. 11 is a flowchart illustrating an operating method of an inspection apparatus according to an embodiment of the disclosure.

FIG. 12 illustrates a screen displayed after a reference range is adjusted by an inspection apparatus according to an embodiment of the disclosure.

DETAILED DESCRIPTION

Figure 1:
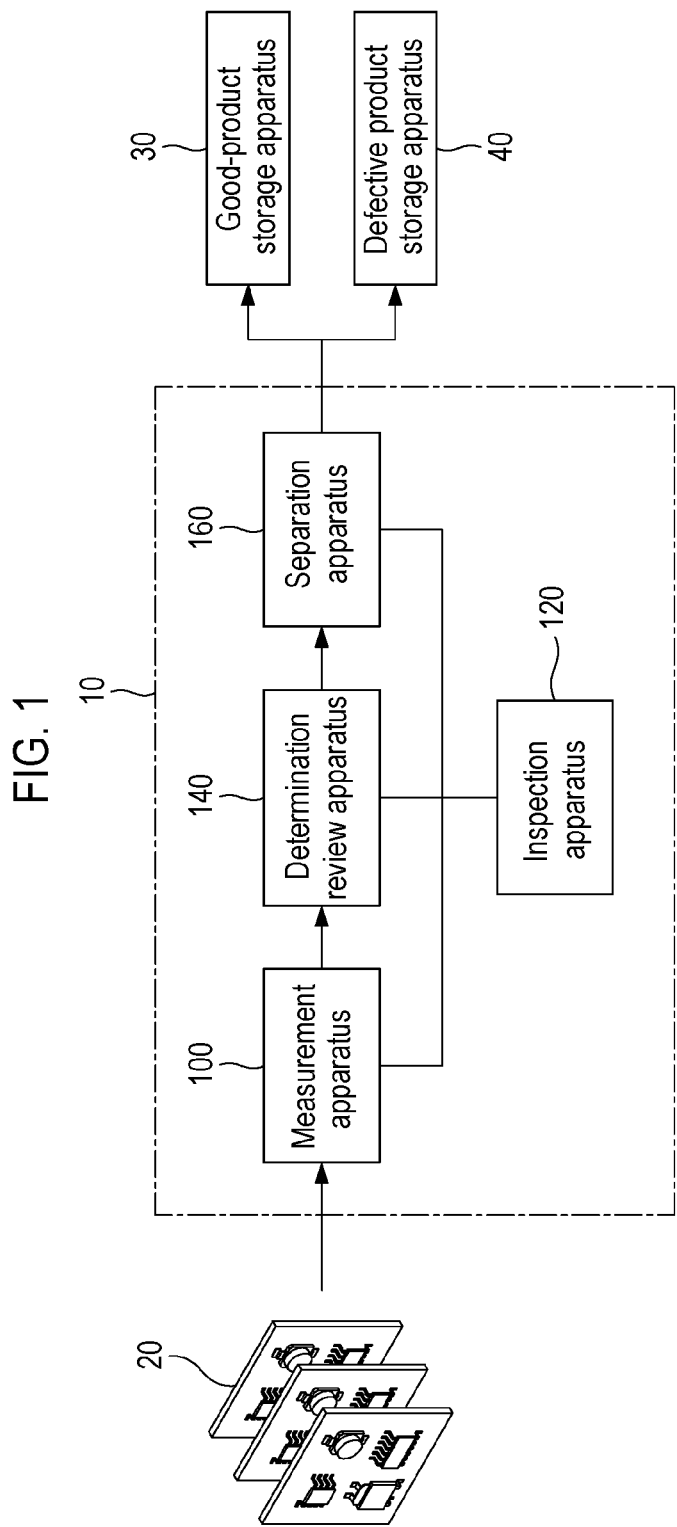
FIG. 1 is a view schematically illustrating an inspection system for determining whether a defect has occurred in an inspection object according to an embodiment of the disclosure.

Embodiments of the present disclosure are illustrated for describing the present disclosure. Embodiments of the present disclosure may be performed in various forms, and the present disclosure should not be construed as being limited to the embodiments described below or to the detailed descriptions of the embodiments.

The term "unit" used herein means a software component or a hardware component, such as a field-programmable gate array (FPGA) and an application specific integrated circuit (ASIC). However, the "unit" is not limited to software and hardware. The "unit" may be configured to be provided in an addressable storage medium, or may be configured to run one or more processing units. Accordingly, for example, the "unit" may include components, such as software components, object-oriented software components, class components, and task components, as well as processing units, functions, attributes, procedures, subroutines, segments of program codes, drivers, firmware, micro-codes, circuits, data, databases, data structures, tables, arrays, and variables. Functions provided by the components and the "unit" may be combined into a smaller number of components, or may be further divided into additional components and "units."

All technical or scientific terms used herein have meanings that are generally understood by a person skilled in the art to which the present disclosure pertains, unless otherwise specified. The terms used herein are selected for the purpose of clarifying the subject matter of the present disclosure, and are not intended to limit the scope of the present disclosure.

A singular expression herein may include meanings of plurality, unless otherwise mentioned, and the same is applied to a singular expression stated in the claims.

The terms "first", "second", and the like used in various embodiments of the present disclosure are used to distinguish between a plurality of components, and are not intended to limit the order or importance of the relevant components.

The expressions "include", "have" and the like used herein should be understood as open-ended terms connoting the possibility of inclusion of other embodiments, unless otherwise mentioned in a phrase or sentence including the expressions.

The expression "based on" used herein is used to describe one or more factors that influences a decision, an action of determination, or an operation described in a phrase including the relevant expression, and this expression does not exclude additional factors influencing the decision, the action of determination, or the operation.

When a certain component is described as "coupled to" or "connected to" another component herein, it should be understood that the certain component may be directly coupled or connected to another component, or that the certain component may be coupled or connected to another component via a new intervening component.

In the following description, process steps, method steps, algorithms, and the like have been described in a sequential order in the flowcharts shown in the accompanying drawings, but such processes, methods, and algorithms may be configured to operate in an arbitrary appropriate order. In other words, the steps of the processes, methods, and algorithms described in various embodiments of the disclosure need not be performed in the order described in this disclosure. Also, although some steps may be described as being performed asynchronously, in other embodiments, these steps may be performed simultaneously. Moreover, illustration of the process by depiction in the drawings does not mean that the illustrated process excludes other changes and modifications thereto and any of the illustrated process or steps thereof is essential to one or more of the various embodiments of the disclosure. It does not mean that the illustrated process is preferred.

Hereinafter, embodiments of the present disclosure will be described with reference to the accompanying drawings. In the drawings, like components are indicated by like reference numerals, and repeated descriptions of the same components will be omitted.

FIG. 1 is a view schematically illustrating an inspection system 10 for determining whether a defect has occurred in an inspection object according to an embodiment of the disclosure.

The inspection system 10 according to an embodiment of the present disclosure may determine whether each of a plurality of inspection objects 20 is good or defective, and may separate the plurality of inspection objects to be transferred to a good-product storage device 30 or a defective-product storage device 40 according to the determination result. Here, the inspection object 20 may be any product having a three-dimensional structure manufactured according to predetermined design criteria. For example, the inspection object 20 may be a printed circuit board (PCB) on which electronic components are mounted.

The inspection system 10 may include a measurement device 100, a quality determination device 120, a determination review device 140, and a separation device 160. The inspection system 10 may also include a network 180 for connecting the measurement device 100, the inspection apparatus 120, the determination review device 140, and the separation device 160 to each other and performing communication therebetween. As illustrated in FIG. 1, the inspection object 20 may be transferred to the good-product storage device 30 or the defective-product storage device 40 through the measurement device 100, the determination review device 140, and the separation device 160 along a direction of an arrow.

According to an embodiment, the inspection system 10 may be installed at the end of a manufacturing stage for manufacturing the inspection object 20 or at the end of a processing stage for processing the inspection object 20. In this case, the inspection system 10 may determine whether the manufactured or processed inspection object 20 is manufactured according to predetermined design criteria. In addition, the inspection system 10 may transfer inspection objects 20 determined to be good to the good-product storage device 30, and may transfer inspection objects 20 determined to be defective to the defective-product storage device 40 according to a determination result.

The measurement device 100 may generate a measurement value for the inspection object 20. For example, the measurement device 100 may generate the measurement value for the inspection object 20 by measuring the structure (e.g., three-dimensional structure) of the inspection object 20. According to an embodiment, the measurement device 100 may measure the structure of the inspection object 20 using light. For example, the measurement device 100 may irradiate the inspection object 20 with structured light, may receive light reflected from the inspection object 20, and may generate image data of the inspection object 20 based on the received light. In addition, the measurement device 100 may generate the measurement value for the inspection object 20 by measuring the structure of the inspection object 20 based on the image data. The measurement values generated by the measurement device 100 may be transmitted to the inspection apparatus 120. The configuration and operation of the measurement device 100 will be described in more detail with reference to FIG. 2.

The inspection apparatus 120 may determine whether a defect has occurred in the inspection object. The inspection apparatus 120 may determine whether a defect has occurred in the inspection object 20 by determining whether the measurement value generated by the measurement device 100 is within a predetermined reference range. In addition, the inspection apparatus 120 may determine whether a defect has occurred in the inspection object 20 by comparing the measurement value generated by the measurement device 100 with a predetermined reference value. According to an embodiment, the inspection apparatus 120 may calculate an error value between the measurement value and a design value for the inspection object 20. The inspection apparatus 120 may determine that no defect has occurred in the inspection object 20, of which the error value is equal to or less than a predetermined reference value or is within a predetermined reference range, and may determine that a defect has occurred in the section object 20, of which the error value exceeds the predetermined reference value or is out of the predetermined range.

According to an embodiment, the inspection apparatus 120 may determine some of the inspection objects 20, for which it is determined that the defect has not occurred in the inspection object 20, of which the error value is equal to or less than the predetermined reference value or is within the predetermined reference range, to be "warning". For example, if the error value of the inspection object 20 is the predetermined reference value or within a predetermined range close to an upper limit or a lower limit of the predetermined reference range, the inspection apparatus 120 may determine the corresponding inspection object 20 to be "warning".

The determination review device 140 may determine whether there is an error in determining whether a defect has occurred in the inspection object 20 by the inspection apparatus 120. For example, there may be a case where the inspection object 20 determined by the inspection apparatus 120 that the defect has not occurred is actually defective. In addition, there may be a case where the inspection object 20 determined by the inspection apparatus 120 that a defect has occurred is actually good. Such a determination error may occur when the reference value used in determining whether a defect has occurred in the inspection object 20 is not properly configured. For example, in a case in which a predetermined reference value to be compared with the error value is configured to be high, when the inspection apparatus 120 determines the inspection object 20 that actually has a defect to have no defect, the determination review device 140 may determine that this determination is an error. Also, in a case in which the predetermined reference value to be compared with the error value is configured to be low, when the inspection apparatus 120 determines the inspection object 20 that actually has no defect to have a defect, the determination review device 140 may determine that this determination is an error.

The determination review device 140 may be implemented using a device determining whether a defect actually has occurred in the inspection object 20. For example, the determination review device 140 may include a device that can more accurately measure the structure of the inspection object 20. As another example, the determination review device 140 may include a device that can identify the electrical characteristics of the inspection object 20.

According to an embodiment, the determination review device 140 may determine whether or not there is a determination error in some of the inspection objects 20 that are determined to be good or to be defective by inspection apparatus 120. For example, the determination review device 140 may determine whether or not there is a determination error in the inspection object 20 that is determined to be "warning" or "defective" by the inspection device 120. In this case, the efficiency may be improved as compared to the case of determining the determination error in all inspection objects.

According to another embodiment, the determination review device 140 may also determine whether or not there are determination errors in all inspection objects 20 that are determined to be good or defective by the inspection apparatus 120. In this case, accuracy may be improved compared to the case of determining the determination error of some inspection objects. A review result of the determination review device 140 may be transmitted to the inspection apparatus 120 through the network 180.

According to another embodiment, the determination review device 140, based on a distribution of the measured error values, may estimate a range of good error values of inspection objects 20 determined to be good, and may further estimate a range of defective error values of inspection objects 20 determined to be defective.

Error values of the physical properties of products produced according to a specific manufacturing process may have a constant probability distribution. The error values of inspection objects 20, which are produced through a given process and are determined to be good, may have a distribution of good error values, which is, for example, expressed as a Gamma distribution curve. The error values of inspection objects 20 which are determined to be defective due to problems other than the process may have a distribution of defective error values, which is, for example, expressed as a Normal distribution curve.

Using the above, the determination review device 140 may determine at least one probability distribution curve that most closely fits the distribution of the measured error values, may regard a probability distribution curve that is closest to the origin, among the determined probability distribution curves, as the distribution of the good error values, and may regard the remaining probability distribution curves (if any) as the distribution of the defective error values.

Meanwhile, vertical axes of graphs of a distribution curve of the good error values and a distribution curve of the defective error values denote the number of inspection object samples, which is a natural number. Thus, it may be possible to consider that one or more inspection object samples exist stochastically only in a range of the horizontal axis in which the vertical axis value of the graph is 1 or more and that if a value is out of the range of the horizontal axis above, an inspection object sample of less than 1 exists (i.e., no inspection object sample exists). In some cases, the user may consider only the range of error values in which the number of inspection object samples is a predetermined number or more as a meaningful range of the error values. In some cases, the user may consider only the range of error values, which includes the inspection object samples of a predetermined percentage of the inspected inspection object samples (e.g., the inspection object samples of 99.5% in order from the smallest error value to the largest error value), as a meaningful range of the error values.

According to these observations, a range of good error values or a range of defective error values, which is considered to be meaningful by the user, may be estimated from the distribution curve of the good error values or the distribution curve of the defective error values. The meaningful distribution of the defective error values may not be obtained depending on the situation, and thus the meaningful range of defective error values may not be estimated.

More specifically, the determination review device 140 may estimate a distribution of the good error values using a predetermined probability distribution function from the distribution of given sample error values, and may further estimate a distribution of the defective error values as necessary. In this case, the determination review device 140 may estimate a range of good error values in which one or more samples exist from the distribution of the good error values, and may estimate a range of the defective error values in which one or more samples exist from the distribution of the defective error values (if any).

If the estimated range of the good error values and range of the defective error values partially overlap each other, the determination review device 140 may re-estimate a reduced range of the good error values and a reduced range of the defective error values, respectively, in consideration of the area where the distribution of the good error values and the distribution of the defective error values overlap each other.

If two or more distributions of the defective error values are estimated, the determination review device 140 may re-estimate an integrated range of the defective error value encompassing ranges of the defective error values, which are estimated from the respective distributions of the defective error values.

The determination review device 140 may determine whether or not there is an error in the quality determination of the inspection object 20 performed by the inspection apparatus 120 based on the estimated range of the good error values and further based on (if any) the estimated range of the defective error values.

For example, if the reference value of quality determination falls within the range of the good error values, and if an error value of a certain inspection object 20 is greater than the reference value but is within the range of the good error values, the determination review device 140 may determine that there is a second type of error (false call) in which the inspection object 20 which is determined to be defective due to the reference value but is actually good, and may determine that the current reference value is too strict.

For example, if the reference value of quality determination falls within or exceeds the range of the defective error values, and if an error value of a certain inspection object 20 is less than the reference value but is within the range of the defective error values, the determination review device 140 may determine that there is a first type of error (escape) in which the inspection object 20 which is determined to be good due to the reference value but is actually defective, and may determine that the reference value is too loose.

Accordingly, the determination review device 140 may determine the number of inspection objects in which a determination error has occurred by means of the number of inspection objects 20 having error values, which are within the range of the good error values and greater than a reference value, in the case where the reference value of quality determination falls within the range of the good error values or by means of the number of inspection objects 20 having error values, which are within the range of the defective error values and less than a reference value, in the case where the reference value of quality determination falls within the range of defective error values or exceeds the same.

The determination result of the determination review device 140 may be transmitted to the inspection apparatus 120 through the network 180. In addition, the distribution of the good error values and the range of the good error values, which are estimated by the determination review device 140, may also be transmitted to the inspection apparatus 120 via the network 180. Additionally, the distribution of the defective error values and the range of the defective error values, which are estimated by the determination review device 140, may also be transmitted to the inspection apparatus 120 through the network 180.

As described above, the determination review device 140 may identify inspection objects 20 that are strongly expected to have the determination error from the distributions of error values detected in the samples in the early stages of production even though the samples determined to be defective are not actually re-inspected accurately, and may further determine an appropriateness of the current reference value.

The inspection apparatus 120 according to an embodiment of the disclosure may adjust a determination condition of determination whether a defect for the inspection object 20 has occurred such that the number of inspection objects 20 in which a determination error has occurred by the determination review device 140 is reduced. The inspection apparatus 120 may update the reference value to be compared with the error values based on the result of determination whether the defect has occurred for the inspection object 20 generated by the inspection apparatus 120 and the result of the determination review of the inspection object 20 generated by the determination review device 140. For example, if it is determined by the determination review device 140 that a first error (Escape) has occurred in at least a part of inspection objects 20, the inspection apparatus 120 may reduce the reference value or reference range to be compared with the error values. In addition, if the determination review device 140 determines that a second error (False call) has occurred in at least a part of inspection objects 20, the inspection apparatus 120 may increase the reference value or reference range to be compared with the error values.

The inspection apparatus 120 may update the reference value or reference range to be compared with the error values according to user input. The inspection apparatus 120 may graphically display the result of determination whether the defect has occurred in the inspection objects 20, the result of the determination review, and the reference value for inspection objects 20. The user may provide a graphical input to the inspection apparatus 120 to adjust the reference value or reference range such that the number of inspection objects in which the determination error has occurred is reduced based on the graphically displayed result of determination whether the defect has occurred and result of the determination review. The inspection apparatus 120 may update the reference value or reference range in response to the graphical input of the user.

The inspection apparatus 120 may compare the updated reference value or reference range with the error values, thereby re-determining whether a defect has occurred in the inspection object 20. In addition, the inspection apparatus 120 may identify whether or not there is an error in the re-determination result for the inspection object 20 based on the result of the determination review generated by the determination review device 140, which indicate whether the inspection object 20 is actually good or defective. Accordingly, the inspection apparatus 120 may graphically display the result of re-determination whether the defect has occurred for the inspection objects 20, the updated reference value or reference value, and the number of inspection objects in which the re-determination error has occurred.

The inspection apparatus 120 may be implemented using a computing device, such as, a server computer, a personal computer, a laptop computer, a smartphone, or a tablet PC. The configuration and operation of the inspection apparatus 120 will be described in more detail with reference to FIGS. 3 to 10.

The separation device 160 may separate the inspection objects 20 to be transferred to the good-product storage device 30 or the defective-product storage device 40. The separation device 160 may transfer inspection objects 20 determined to be good and inspection objects 20 determined to be defective to the good-product storage device 30 and the defective-product storage device 40, respectively, based on the redetermination results by the inspection apparatus 120.

The network 180 enables connections and communication between the measurement device 100, the inspection apparatus 120, the determination review device 140, and the separation device 160. The network 180 may be implemented using a wired network, such as a local area network (LAN), a wide area network (WAN), a value added network (VAN), or the like, or using a wireless network, such as a mobile radio communication network, a satellite communication network, Bluetooth, the wireless broadband Internet (Wibro), high-speed downlink packet access (HSDPA), or the like.

Although the respective devices of the inspection system 10 are illustrated as separate configurations in FIG. 1, the present disclosure is not limited thereto, and at least some of the configurations of any one of the inspection apparatus 120, the determination review device 140, and the separation device 160 may be integrated into other devices. According to an embodiment, at least some configurations of the determination review device 140 may be integrated into the inspection apparatus 120. For example, the configuration of the determination review device 140 for determining an error of the quality determination through estimation from a distribution of error values may be implemented as the inspection apparatus 120.

Figure 2:
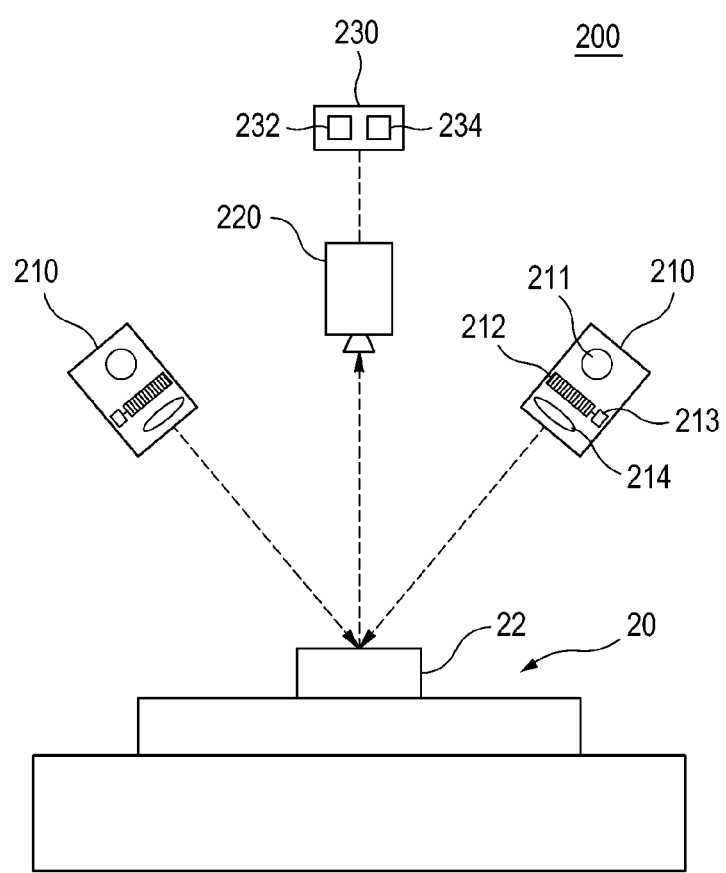
FIG. 2 is a view schematically illustrating the configuration of a measurement device for measuring a structure of an inspection object according to an embodiment of the present disclosure.

FIG. 2 is a view schematically illustrating the configuration of a measurement device 200 for measuring a structure of an inspection object according to an embodiment of the present disclosure. According to a plurality of embodiments, the measurement device 200 in FIG. 2 may include all the technical features of the measurement device 100 in FIG. 1. As illustrated in FIG. 2, the measurement device 200 includes an illumination unit 210, a imaging unit 220, and an image processing unit 230.

The illumination unit 210 irradiates pattern light to the inspection target 22, which is a part of the inspection object 20, in order to measure the inspection target 22. For example, the inspection object 20 is a printed circuit board, and the inspection target 22 is a solder formed on the printed circuit board or an electronic part mounted on the printed circuit board. However, the inspection object 20 and the inspection target 22 according to the present disclosure are not limited thereto, and may be any of products having a three-dimensional structure.

In an embodiment, the illumination unit 210 includes a light source 211 for emitting light, a grating element 212 for converting light from the light source 211 into the pattern light, a grating-transferring mechanism 213 for transferring the grating element 212 by a pitch, and a projection lens 214 for projecting the pattern light converted by the grating element 212 to the inspection target 22. For example, the grating element 212 may be transferred by a predetermined distance (e.g., $2\pi/N$, where N is a natural number of 2 or more) using the grating-transferring mechanism 213, such as a piezo (PZT) actuator, for phase shift of the pattern light.

As illustrated in FIG. 2, two illumination units 210 may be provided. However, the illumination unit 210 according to the present disclosure is not limited thereto, and one illumination unit 210 or three or more illumination units 210 may be provided. If two or more illumination units 210 are provided, a plurality of illumination units 210 may be arranged to be spaced at a predetermined angle apart from each other along a circumferential direction or a virtual polygonal plane, or may be arranged to be spaced a constant distance apart from each other along the direction perpendicular to the inspection object 20.

The imaging unit 220 may receive the light reflected by the inspection target 22, thereby acquiring image data of the inspection target 22. The imaging unit 220 may be implemented using a CCD (charge coupled device) camera or a CMOS (complementary metal oxide semiconductor) camera, but it is not limited thereto. The imaging unit 220 may be provided above the inspection object 20 in the vertical direction.

The image processing unit 230 processes the image data acquired by the imaging unit 220, thereby generating measurement values of the structure of the inspection target 22. For example, the image processing unit 230 measures the width, length, height, area, volume, etc. of the inspection target 22 from the image data of the inspection target 22. The measurement values generated by the image processing unit 230 may be stored in the storage 232 of the image processing unit 230, or may be transmitted to the inspection apparatus 120 by the communication unit 234.

Figure 3:
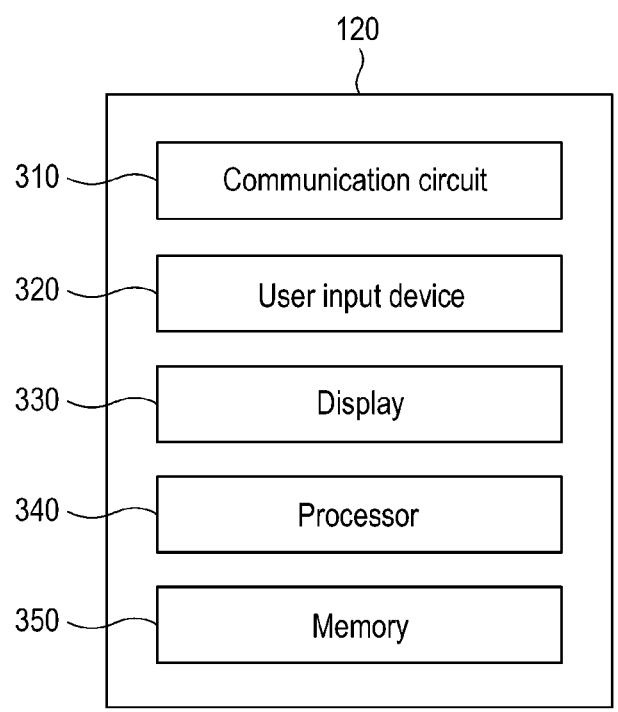
FIG. 3 is a block diagram illustrating the detailed configuration of a quality determination device for determining whether the inspection object is good or defective according to an embodiment of the present disclosure.

FIG. 3 is a block diagram illustrating the configuration of an inspection apparatus 120 according to an embodiment of the disclosure. The inspection apparatus 300 according to an embodiment of the disclosure includes a communication circuit 310, a user input device 320, a display 330, a processor 340, and a memory 350.

The communication unit 310 may communicate with other devices, such as the measurement device 100, the determination review device 140, and the separation device 160 in FIG. 1. In the communication unit 310, subcomponents for communication with the above devices may be integrated into a single hardware device.

The user input unit 320 may receive an input related to a determination whether the defect has occurred from a user. For example, the user input unit 320 may receive an input for adjusting the reference value or reference range used for the determination whether the defect has occurred, an input for displaying the result of determination whether the defect has occurred, an input for selecting one of the results of determination whether the defect has occurred, and the like. The user input unit 320 may include a keyboard, a mouse, a touchpad, a touch screen, and the like.

The display 330 provides the user with outputs related to the determination whether the defect has occurred. For example, the display 330 may display the result of determination whether the defect has occurred for the inspection objects 20, the reference value or reference range used for the determination whether the defect has occurred, and the like. The display 330 may include a liquid crystal display (LCD), a light-emitting diode (LED) display, an organic light-emitting diode (OLED) display, and the like.

The processor 340 may drive an operating system or an application program to control at least one component of the inspection apparatus 120, and may perform various data processing and calculations. For example, the processor 340 may include a central processing unit or the like, or may be implemented as a system on chip (SoC). In addition, the processor 340 may process data related to determination whether the defect has occurred.

The memory 350 may store instructions or data related to at least one other component of the inspection apparatus 120. In addition, the memory 350 may store software and/or a program. For example, the memory 350 may include an internal memory or an external memory. The internal memory may include at least one of volatile memory (e.g., DRAM, SRAM, or SDRAM), non-volatile memory (e.g., flash memory, hard drive, or solid state drive (SSD)). The external memory may be functionally or physically connected to the inspection apparatus 120 through various interfaces.

In one embodiment, the memory 350 may store instructions for operating the processor 340. For example, the memory 350 may store instructions for the processor 340 to control other components of the inspection apparatus 120 and to interoperate with an external electronic device or an external server. In addition, instructions for performing operations by the respective components may be stored in the memory 350. The processor 340 may control the other components of the inspection apparatus 120 and incorporate with an external electronic device or an external server based on the instructions stored in the memory 350. Hereinafter, the operation of the inspection apparatus 120 will be described mainly based on the respective components of the inspection apparatus 120.

The memory 350 may store data related to the determination whether the defect has occurred. The memory 350 may store design values of all inspection targets 22 of the inspection object 20. For example, when the inspection object 20 is a PCB, the width and length of a pad formed on the PCB, the volume and area of a solder placed on the pad, a height from an electronic component placed on the solder to the pad, and the like may be stored in the memory 350 as the design values.

In addition, the memory 350 may store measurement values for all the inspection targets 22 of the inspection object 20. The measurement value stored in the memory 350 may correspond to the design value stored in the memory 350. According to an embodiment, the measurement value for the inspection object 20 may be generated by the measurement device 200 of FIG. 2. The measurement value generated in the measurement device 200 may be stored in the memory 350 through the communication circuit 234 of the measurement device 200 and the communication circuit 310 of the inspection apparatus 300.

The processor 340 may calculate an error value of the measurement value with respect to the design value of the inspection target 22 of the inspection object 20. The processor 340 calculates a difference between the design value of the inspection target 22 of the inspection object 20 stored in the memory 350 and the measurement value of the inspection target 22 of the inspection object 20 stored in the memory 350 as an error value. The calculated error value may be stored in the memory 350.

The processor 340 may determine whether the measurement value for the inspection object 20 satisfies a predetermined criterion. The processor 340 may compare the error value stored in the memory 350 with the reference value or reference range stored in the memory 350 to determine whether a defect has occurred in the inspection object 20. According to an embodiment, the processor 350 may determine that the inspection object 20 has no defect if an error value for the inspection target 22 of the inspection object 20 is equal to or less than a reference value for the corresponding inspection object 20, and may determine that the inspection object 20 has a defect if the error value exceeds the reference value or is out of the reference range. For example, if the reference value for the length of a pad of the inspection object 20 is set to 0.5 mm, the processor 350 determines the inspection object 20 having an error value of 0.6 mm for the length of the pad to have a defect and determines inspection object 20 having an error value of 0.4 mm to have no defect. The result of the determination whether the defect has occurred generated by the processor 340 may be stored in the memory 350.

The memory 350 stores the result of the determination review, indicating whether or not there is an error in the determination whether the defect has occurred, of the processor 340 for the inspection target 22 of the inspection object 20. If an error has occurred in the determination whether the defect has occurred for the inspection target 22, "determination error" may be displayed as the result of the determination review for the corresponding inspection target 22. The determination error includes a first error (Escape) in which the inspection target 22 determined to have no defect by the processor 340 is actually defective and a second error (False Call) in which the inspection target 22 determined to have a defect by the processor 340 is actually good. That is, the first error may occur by determining that a defect has not occurred in an inspection object having a defect and the second error may occur by determining that a defect has occurred in an inspection object having no defect.

According to an embodiment, the determination review results stored in the memory 350 may be generated by the determination review device 140 in FIG. 1. The communication circuit 310 may receive the determination review results generated by the determination review device 140, and may store the same in the memory 350. In addition, the first error value distribution, the first error value range, the second error value distribution (if any), and the second error value range (if any), which are estimated by the determination review device 140, may be stored in the memory 350 through the communication circuit 310 of the inspection apparatus 300.

The processor 340 may generate an inspection result graph indicating the number of inspection objects depending on error values. According to an embodiment, the inspection result graph may be a two-dimensional graph, wherein the horizontal axis indicates error values and the vertical axis indicates the number of inspection objects 20 having corresponding error values. In addition, the processor 340 may display a GUI (graphical user interface) object, which is movable by manipulation of the user, as a reference value or reference range on the inspection result graph. For example, the GUI object indicating the reference value or reference range may have a shape such as a bar, an arrow, a line, a point, a square, or the like.

The processor 340 may display the result of the determination whether the defect has occurred for the inspection objects 20 on the inspection result graph. According to an embodiment, the processor 340 may display "good", "warning", and "defective" as the result of the determination whether the defect has occurred on the inspection result graph. For example, the processor 340 may display the area where error values are equal to or less than a reference value or within a reference range as "good" on the inspection result graph, and may display the area where error values exceed the reference value or are out of the reference range as "defective" on the inspection result graph. In addition, the processor 340 may display a predetermined area where error values are close to the reference value and an upper limit or a lower limit of the reference range as "warning" on the inspection result graph. In this case, the boundary of the area corresponding to "warning" may be displayed on the inspection result graph. In addition, according to an embodiment, the processor 340 may display the number of inspection objects 20 corresponding to "good", "warning", and "defective", respectively, on the inspection result graph.

The processor 340 may display the review result for the result of the determination whether the defect has occurred on the inspection result graph. According to an embodiment, the processor 340 may display, as the result of the determination review, a first error (Escape) and a second error (False Call) on the inspection result graph. For example, the processor 340 displays the area including the inspection objects 20 that are actually determined to have no defect, among the areas where the error values exceed the reference value or are out of the reference range on the inspection result graph, as the second error. In addition, the processor 340 displays the area including the inspection objects 20 that are actually determined to have a defect, among the areas where the error values are equal to or less than the reference value or are within the reference range on the inspection result graph, as the first error.

According to an embodiment, determination errors, such as the first error and the second error, may be determined through accurate inspection by the determination review device 140. The determination review device 140 may include a device more accurately measuring the structure of the inspection object 20 or a device measuring the electrical characteristics of the inspection object 20. The determination review device 140 may more accurately measure the structural and electrical characteristics of the inspection object 20, thereby determining whether or not the inspection object 20 are actually good or defective. As a result, the determination review device 140 may identify the inspection objects 20 that are actually defective from among the inspection objects 20 determined to have no defect, and may identify the inspection objects 20 that are actually good from among the inspection objects 20 determined to have a defect.

According to another embodiment, the determination error may be determined through estimation from the distribution of error values by the determination review device 140. The determination review device 140 may determine one or more probability distribution curves fitting to the distribution of the error values of the inspection object 20, which is measured by the measurement device 100, may regard the probability distribution curve closest to the origin, among the determined probability distribution curves, as a first error value distribution, and may regard the remaining probability distribution curves (if any) as a second error value distribution. The determination review device 140 may estimate the first error value range from the first error value distribution, and may estimate the second error value range from the second error value distribution (if any). In addition, the determination review device 140 may determine the inspection objects 20 in which determination error has occurred, among the inspection objects 20, based on the first error value range and the second error value range (if any).

According to the above-described embodiment, the determination review device 140 may determine an error of the determination whether the defect has occurred through estimation from the distribution of the error values, and the processor 340 may identify the inspection objects 20 in which determination error has occurred based on the error of the determination whether the defect has occurred determined by the determination review device 140, but the disclosure is not limited thereto. For example, the processor 340 may directly determine the error of the determination whether the defect has occurred through estimation from the distribution of the error values, and may identify the inspection objects 20 in which determination error has occurred.

According to an embodiment, the processor 340 may determine a candidate reference value so as to update the reference value. The processor 340 may determine at least one candidate reference value such that the number of inspection objects 20 in which determination error has occurred is reduced or minimized. For example, the processor 340 may determine the candidate reference value such that the area corresponding to the first error (Escape) or the second error (False Call) is reduced or eliminated by replacing the reference value with the candidate reference value. The processor 340 may display the one or more determined at least one candidate reference value on the inspection result graph. For example, the at least one candidate reference value may be represented by points, lines, rectangles, arrows, and the like.

According to an embodiment, the processor 340 may determine the at least one candidate reference value based on the range of the good error value and the second error value range (if any) of the inspection objects 20, which are estimated by the determination review device 140. If the second error value range is provided, the processor 340 may determine the candidate reference value from among values equal to or greater than the maximum value of the first error value range and equal to or less than the minimum value of the second error value range. If no second error value range is provided, the processor 340 may determine the candidate reference value from among values equal to or greater than the maximum value of the first error value range.

According to an embodiment, the user may select a predetermined area on the inspection result graph through the user input device 320. The processor 340, in response to a user input received through the user input device 320, may enlarge the selected predetermined area, and may output the enlarged predetermined area through the display 330. For example, the enlarged predetermined area may be output so as to overlap the inspection result graph.

According to an embodiment, the processor 340 may generate an inspection result list that includes at least one of measurement values, error values, a result of the determination whether the defect has occurred, and a result of determination error review for the inspection objects 20. The processor 340 may output the inspection result graph and the inspection result list through the display 330. The inspection result graph and inspection result list may be identified through the display 330.

According to an embodiment, the user may select any one of the inspection objects 20 from the inspection result list through the user input device 320. In response to the user input received through the user input device 320, the processor 340 may display the error values of the selected inspection object 20 on the inspection result graph. For example, the error values of the selected inspection object 20 may be displayed in the form of a point, line, square, arrow, and the like. According to another embodiment, if no input for selecting the inspection object 20 is received from the user, an inspection object 20 that has most recently been determined to have no defect or to have a defect may be automatically selected. In this case, the error values of the inspection object 20 that has most recently been determined to have no defect or to have a defect may be displayed on the inspection result graph.

The processor 340 may update the reference value according to an input received from the user through the user input device 320. According to an embodiment, the processor 340 may receive, from the user, a graphical input for moving the location of a GUI object indicating the reference value on the inspection result graph. For example, the user may click on a movable bar-shaped GUI object indicating the reference value using a mouse as the user input device 320, and may drag the same to a predetermined position on the inspection result graph. In this case, the processor 340, in response to the graphical input above, may update the reference value with a value corresponding to the dragged position. According to another embodiment, the processor 340 may receive, from the user, a graphical input for designating a specific position on the inspection result graph. For example, the user may click on a specific position on the inspection result graph using a mouse as the user input device 320. In this case, the processor 340 may update the reference value with a value corresponding to the clicked position in response to the graphical input above. The updated reference value may be stored in the memory 350 by the processor 340.

The processor 340 may re-determine inspection objects 20 to have no defect or to have a defect based on the reference value updated by the processor 340. According to an embodiment, if the error values for the inspection target 22 of the inspection object 20 is equal to or less than the updated reference value, the processor 340 may re-determine that the inspection object 20 is good, and if the error value exceeds the updated reference value, the processor 340 may determine that the inspection object 20 is defective.

In addition, the processor 340 may identify the inspection object 20, in which re-determination has occurred, among the inspection objects 20. According to an embodiment, the processor 340 may identify the inspection objects 20, in which re-determination error has occurred, based on re-determination results of the inspection objects 20 and the result of the determination reviews stored in the memory 350. For example, the processor 340 may determine that a first error has occurred in the inspection object 20 that was re-determined to have no defect despite the fact that it actually has a defect, and may determine that a second error has occurred in the inspection object 20 that was re-determined to have a defect despite the fact that it actually has no defect.

The processor 340 may display, on the inspection result graph, the updated reference value, the result of the defect occurrence/non-occurrence re-determination using the updated reference value, and the result of the determination review for the result of the defect occurrence/non-occurrence re-determination. The inspection result graph output through the display 330 is identified, thereby confirming that the errors occurring in the defect occurrence/non-occurrence re-determination using the updated reference value are reduced compared with the errors occurring in the determination whether the defect has occurred using the reference value that is not updated.

As described above, the inspection apparatus 120 according to a plurality of embodiments of the disclosure may graphically indicate the result of the determination whether the defect has occurred and a reference value for the inspection objects, and may adjust the reference value according to a graphical input of the user. In addition, the inspection apparatus 120 may perform defect occurrence/non-occurrence re-determination for the inspection object based on the reset reference value, may check whether or not there is an error in the defect occurrence/non-occurrence re-determination, and may graphically indicate the result of the defect occurrence/non-occurrence re-determination and the result of the determination review thereof. As a result, the user may more efficiently and easily adjust the reference value, used for determination whether the defect has occurred, of inspection object. Although the above description focuses on a method of adjusting the reference value, the disclosure is not limited thereto, and the reference range may also be adjusted in the same manner.

Figure 4:
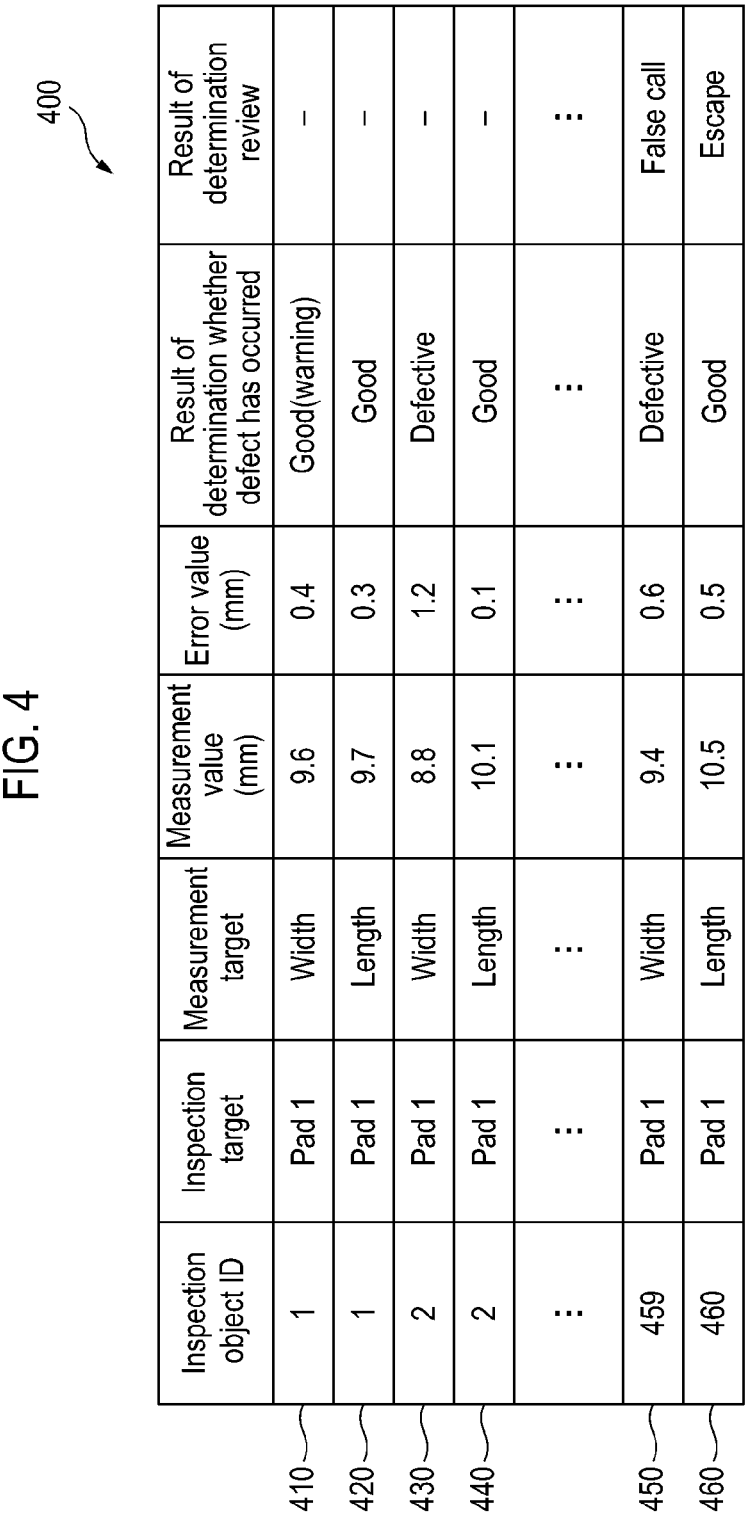
FIG. 4 is a view illustrating an inspection result list including determination error according to an embodiment of the present disclosure.

FIG. 4 illustrates an inspection result list 400 according to an embodiment of the disclosure. The inspection result list 400 in FIG. 4 may be generated by the processor 340 in FIG. 3, and may be output through the display 330.

As illustrated in FIG. 4, the inspection result list 400 includes inspection result data 410, 420, 430, 440, 450, and 460 for each of a plurality of inspection objects. Each of the inspection result data 410, 420, 430, 440, 450, and 460 includes an ID of a corresponding inspection object, an inspection object ID, an inspection target, a measurement target, a measurement value, an error value, a result of a determination whether the defect has occurred, and a result of a determination review.

The inspection result data 410, 430 and 450 include measurement values obtained by measuring the width of "Pad 1" formed on the inspection object and error values obtained by differences between the measurement values and a design value of 10.0 mm. It is assumed that a reference value used for determination whether the defect has occurred of the width of "Pad 1" is set to 0.5 mm. Referring to the inspection result data 410, the inspection object of ID "1" is determined to have no defect because the error value thereof is less than 0.5 mm, thereby determined to be good. On the other hand, referring to the inspection result data 430 and 450, the inspection object of ID "2" and the inspection object of ID "459" are determined to have a defect because error values thereof exceed 0.5 mm, thereby determined to be defective. Among the inspection objects above, the inspection object of ID "459" is determined to have the second error (False Call) as a result of reviewing the determination whether the defect has occurred. For example, the width of "Pad 1" in the inspection object of ID "459" is determined to have a defect according to a predetermined determination criterion, but is actually good.

The inspection result data 420, 440, and 460 include measurement values obtained by measuring the length of "Pad 1" provided on the inspection object and error values obtained by differences between the measurement values and a design value of 10.0 mm. It is assumed that a reference value used for determination whether the defect has occurred of the vertical length of "Pad 1" is set to 0.5 mm. Referring to the inspection result data 410, the inspection objects of ID "1", "2", and "459" are determined to have no defect because the error values thereof are less than 0.5 mm. Among the inspection objects above, the inspection object of ID "460" is determined to have the first error as a result of determination whether the defect has occurred review. For example, the vertical length of "Pad 1" in the inspection object of ID "460" is determined to have no defect according to a predetermined determination criterion, but is actually defective.

Figure 5:
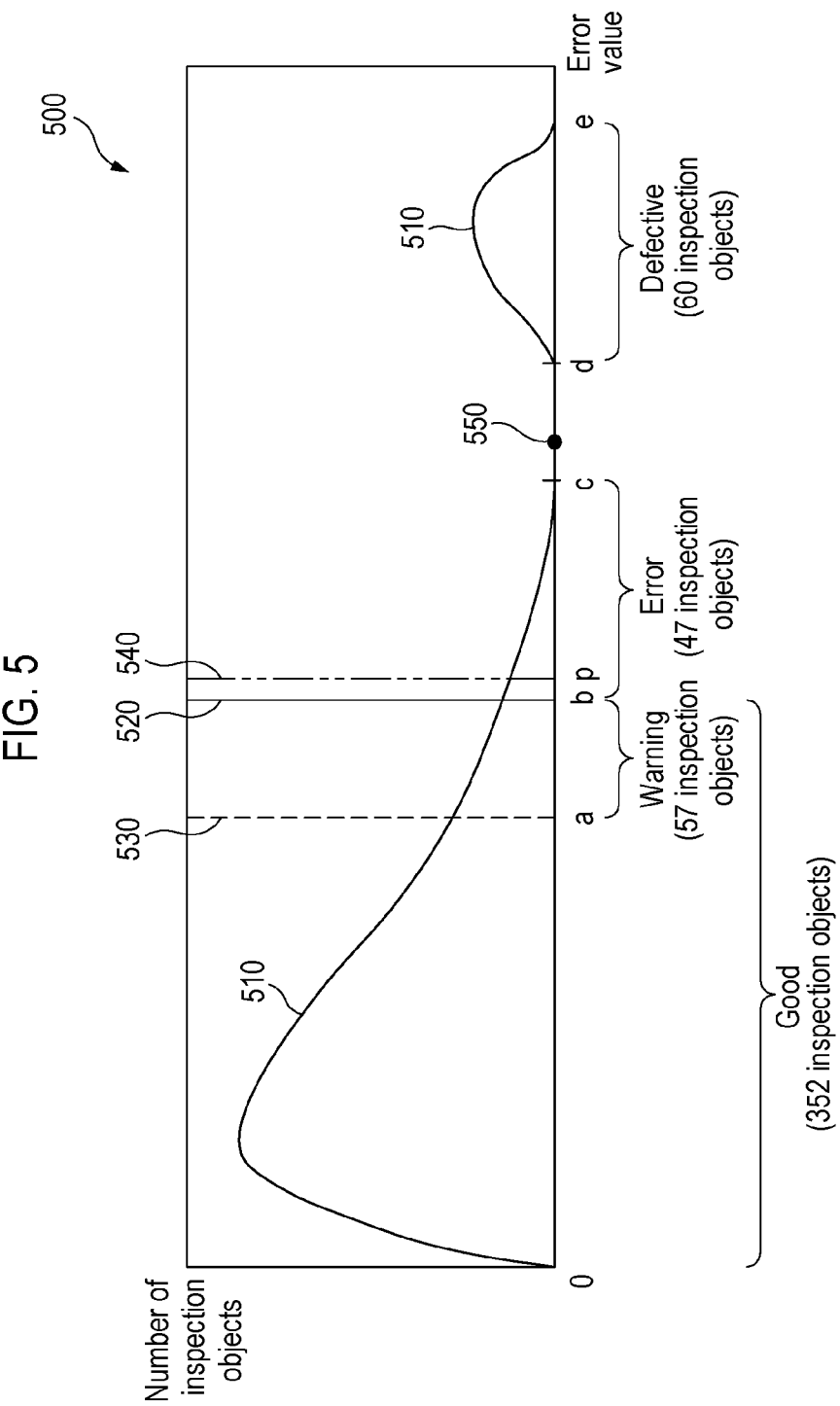
FIG. 5 illustrates an inspection result graph indicating a result of determining whether a defect has occurred in an inspection object and a determination review result according to an embodiment of the disclosure.

FIG. 5 illustrates an inspection result graph 500 indicating a result of determination whether the defect has occurred and a result of determination review according to an embodiment of the disclosure. According to a plurality of embodiments, the inspection result graph 500 in FIG. 5 may be generated by the processor 340 in FIG. 3, and may be output through the display 330 in FIG. 3. According to an embodiment, the inspection result graph 500 in FIG. 5 may be generated in response to reception of an input for selecting any one of inspection result data (e.g., the inspection result data 450) from the inspection result list 400 in FIG. 4 through the user input device 320.

As illustrated in FIG. 5, the horizontal axis of the inspection result graph 500 indicates error values, and the vertical axis thereof indicates the number of inspection objects. The inspection result graph 500 includes a curve 510 indicating the number of inspection objects having corresponding error values. In addition, the inspection result graph 500 may include a first reference value GUI 520 indicating a first reference value used for determination whether the defect has occurred of the inspection objects and a second reference value GUI 530 indicating a second reference value used for determining the inspection objects corresponding to "warning", among the inspection objects determined to be "good". For example, the second reference value may be set to 90% of the first reference value.

In addition, the inspection result graph 500 may include a sample error value indicator 540 that indicates an error value "p" of any specific inspection object, such as an inspection object in which the user is particularly interested, among the inspection objects. For example, the sample error value indicator 540 may indicate the error value of the inspection object selected from the inspection result list 400 in FIG. 4. As another example, the sample error value indicator 540 may indicate the error value of the most recently inspected inspection object, among the inspection objects.

The result of the determination whether the defect has occurred and the result of the determination review may be displayed on the inspection result graph 500. The areas corresponding to "good", "warning", and "error", respectively, as the result of the determination whether the defect has occurred and the area corresponding to "defective" as the result of the determination review may be displayed on the inspection result graph 500. In addition, the number of inspection objects corresponding to "good", "warning", "error", and "defective", respectively, may be displayed on the inspection result graph 500. As illustrated in FIG. 5, 352 inspection objects having error values equal to or less than a first reference value "b" are determined to have no defect and thereby determined to be "good", and 107 inspection objects having error values exceeding the first reference value "b" are determined to have a defect and thereby determined to be "defective". In particular, although 57 inspection objects having error values between a second reference value "a" and the first reference value "b", among the 352 inspection objects determined to have no defect, are determined to be "good", they are classified into "warning" because the error values thereof are close to the first reference value. Meanwhile, since 60 inspection objects having error values between a value "d" and a value "e" are out of a natural error distribution pattern of a given process, it may be possible to determine that defects have occurred due to some problems other than the given process. However, the error distribution of the 47 inspection objects having error values between the first reference value "b" and the value "c" is consistent with the natural error distribution of the 352 inspection objects determined to have no defect, so that 47 inspection objects having error values between the value "b" and the value "c", which have been determined to be "defective", may be normal results of the given process, and may be actually good. Thus, the 47 inspection objects between the first reference value "b" and the value "c" may be determined to have the second error (false call). In order to verify whether or not such a determination corresponds to the second error, the user may select and examine a specific inspection object having an error value "p" between the first reference value "b" and the value "c".

Although problems in the process, which cause the abnormal error values between the value "d" and the value "e", are solved, if the first reference value is maintained to be the value "b", the error values will be naturally distributed between zero and the value "c" in the normal process. Thus, if products continue to be produced using the process, a significant number of products produced subsequently will continue to have the error values between the first reference value "b" and the value "c", and will be determined to have a defect. That is, in the example illustrated in FIG. 5, if the production process itself is not erroneous, the first reference value for determining to have no defect or to have a defect may be regarded as being set to be too strict without reflecting the characteristics of the natural error distribution in the production process.

The inspection result graph 500 may include a candidate reference value indicator 550 indicating a candidate reference value to minimize the number of inspection objects in which determination error has occurred. The candidate reference value may be a candidate for a reference value, which minimizes the number of inspection objects (e.g., 0) determined to be error, and may be selected from the range of error values between the value "c" and the value "d". Although the candidate reference value indicator 550 is denoted by a dot in FIG. 5, it is not limited thereto, and the candidate reference value indicator 550 may be displayed in any of various forms such as an arrow, a line, and a square. In addition, although a single candidate reference value indicator 550 is displayed in FIG. 5, it is not limited thereto, and a plurality of candidate reference value indicators may be displayed, or the candidate reference value indicator may be displayed in a range.

Figure 6:
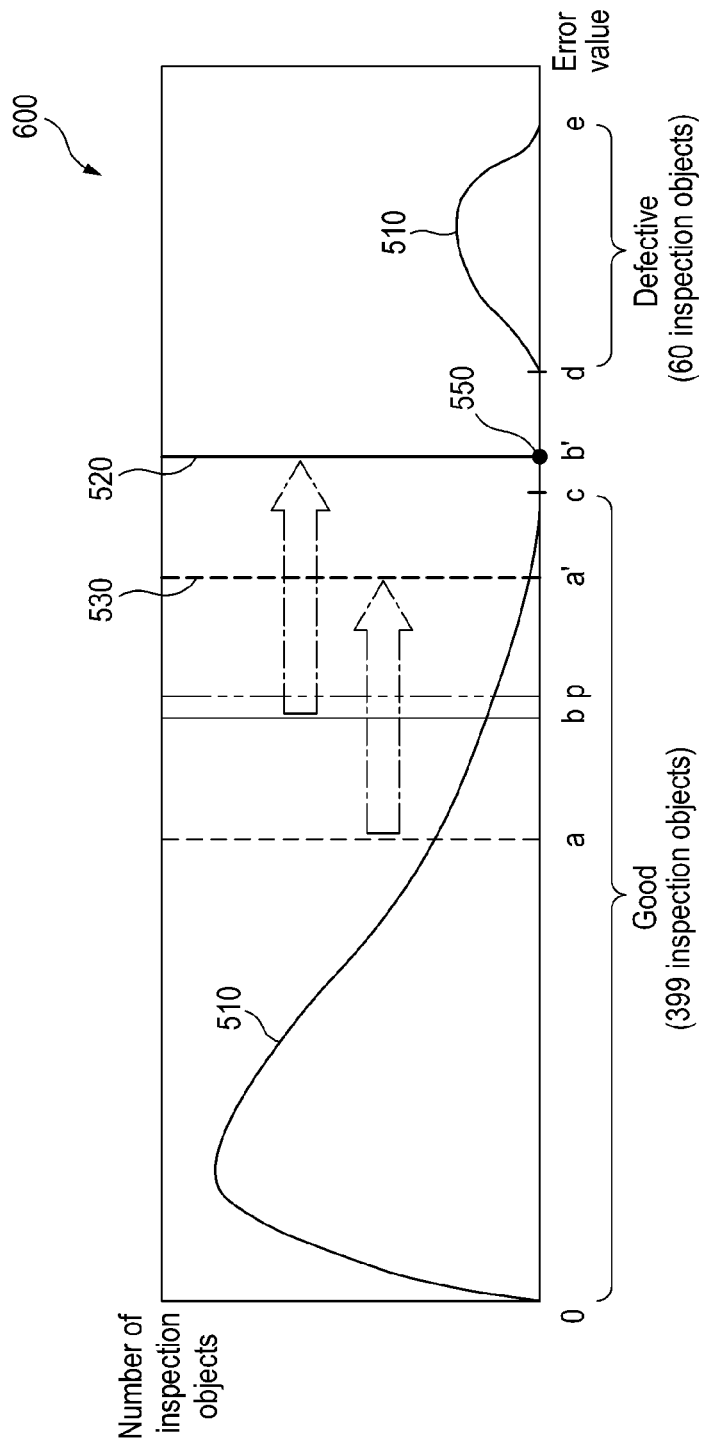
FIG. 6 illustrates an inspection result graph in which a reference value of a graph is updated according to an embodiment of the disclosure.

FIG. 6 illustrates an inspection result graph 600 in which a reference value of a graph is updated according to an embodiment of the disclosure. According to an embodiment, the inspection result graph 600 in FIG. 6 may be obtained from the inspection result graph 500 in FIG. 5 by updating the reference value thereof.

According to an embodiment, the user may update the reference value on the inspection result graph 600 through the user input device 320. For example, the user may drag the first reference value GUI 520 to the position of the candidate reference value indicator 550 on the inspection result graph 600 using a mouse as the user input device 320. As another example, the user may touch the position of the candidate reference value indicator 550 on the inspection result graph 600 using a touchpad. As described above, the position of the first reference value GUI 520 on the inspection result graph 600 is shifted by a graphical input through the user input device 320. In addition, as the position of the first reference value GUI 520 is shifted, the first reference value may be updated as well. For example, as illustrated in FIG. 6, the first reference value is updated from the value "b" to a value "b'".

According to an embodiment, as the position of the first reference value GUI 520 is shifted, the position of the second reference value GUI 530 may also be shifted without a separate user input. For example, if the ratio of the second reference value to the first reference value is set to 90%, the second reference value GUI 530 may be moved to the right such that the second reference value becomes 90% of the updated first reference value. As illustrated in FIG. 6, as the first reference value GUI 520 moves, the second reference value GUI 530 may also move such that the second reference value is updated from the value "a" to a value "a'" corresponding to 90% of the value "b'". According to another embodiment, the second reference value GUI 530 may be moved by a graphical input of the second reference value 530 on the inspection result graph 600 through the user input device 320.

According to an embodiment, in response to the shift of the first and second reference value GUIs 520 and 530, the processor 340 may perform defect occurrence/non-occurrence re-determination for the respective inspection objects based on the updated first and second reference values. The processor 340 may determine each inspection object to have no defect if the error value of the inspection object is equal to or less than the first reference value "b'", and may determine each inspection object to have a defect if the error value of the inspection object exceeds the value "b'". In addition, if the error value of the inspection object is greater than the second reference value "a'" and equal to or less than the value "b'", the processor 340 may determine the inspection object to be "warning". In addition, the processor 340 may identify the inspection object in which a re-determination error has occurred, among the inspection objects.

The results of determination whether the defect has occurred and the determination review results may be displayed on the inspection result graph 600. As illustrated in FIG. 6, 399 inspection objects having error values equal to or less than the value "b'" are determined to be "good", 12 inspection objects having error values greater than the value "a'" and equal to or less than the value "b'" are determined to be "warning", and 60 inspection objects having error values equal to or greater than the value "d" and equal to or less than the value "e" are determined to be "defective". In comparison with the inspection result graph 500 in FIG. 5, the number of inspection objects with errors for determination whether the defect has occurred is reduced from 47 in FIG. 5 to zero in FIG. 6. In other words, the error of determination whether the defect has occurred is minimized by updating the first reference value used as a criterion for determination whether the defect has occurred for the inspection object.

As described above, the first reference value GUI 520 is moved by a graphical input of the user, so that the inspection apparatus 300 may newly determine whether a defect has occurred in the inspection object according to the updated reference value. That is, unlike the conventional process in which the user must visually check the measurement values one by one to determine a new reference value and must input the same in a numerical value, according to the disclosure, the user is able to determine a new reference value while viewing the inspection result graph and is able to update the reference value by a graphical input. As a result, it is possible to change the first reference value by moving the first reference value GUI 520 while the determination error is visually displayed, thereby correcting the determination error quickly and conveniently. In addition, it is possible to newly determine whether a defect has occurred in the inspection object based on the updated reference value, thereby assuring the user's convenience.

Figure 7:
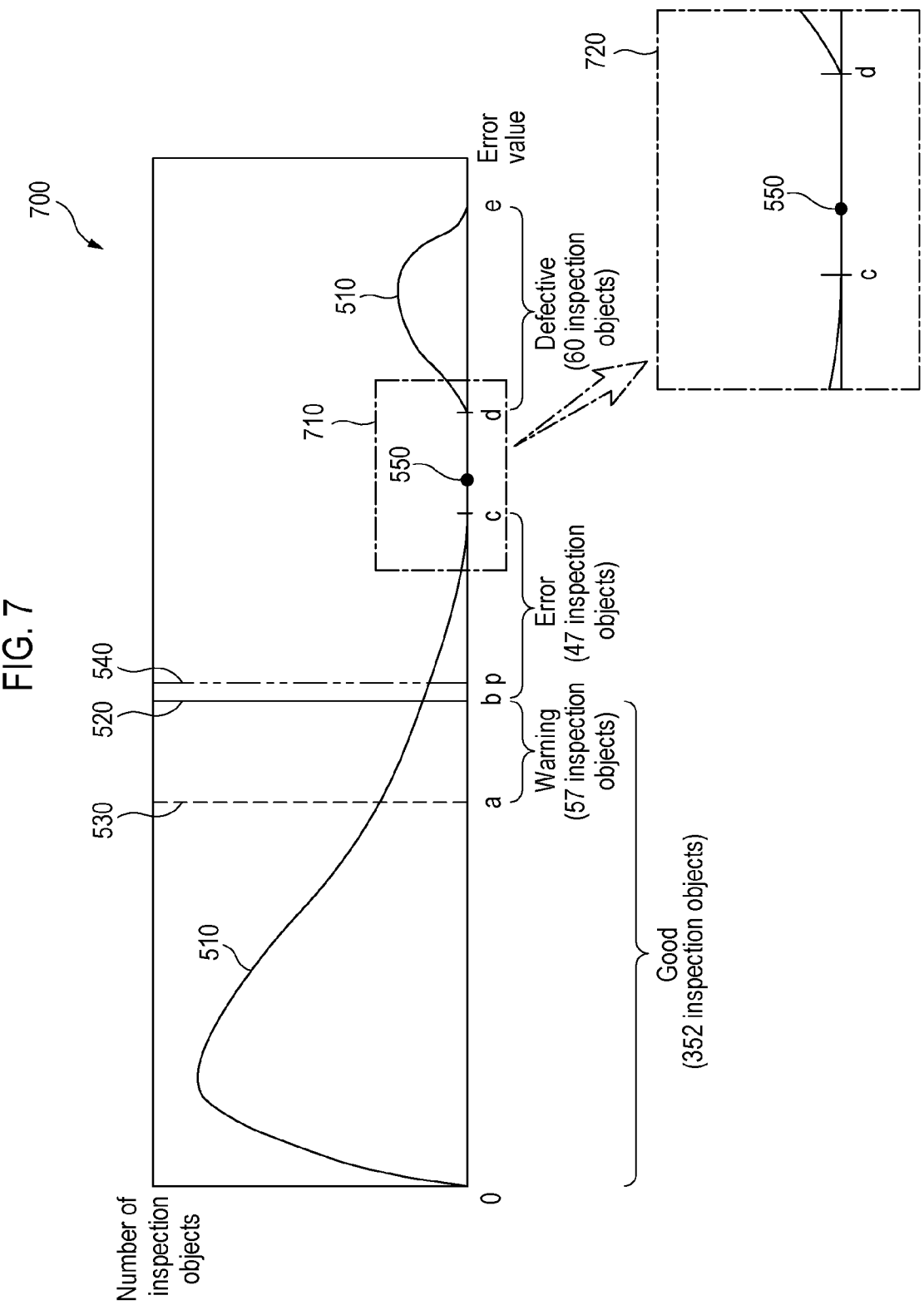
FIG. 7 is a view illustrating an inspection result graph in which a partial area is enlarged according to an embodiment of the present disclosure.

FIG. 7 illustrates an inspection result graph in which a partial area is enlarged according to an embodiment of the disclosure. The inspection result graph 700 in FIG. 7 is a graph indicating a result of the determination whether the defect has occurred and a result of the determination review of the inspection objects, and may be the same as the inspection result graph 500 in FIG. 5.

According to an embodiment, the user may enlarge at least a portion of the inspection result graph 700, which is output through the display 330, using the user input device 320. As an example, the user may select a predetermined area 710 on the inspection result graph 700 using a mouse as the user input device 320. In response to the selection of the predetermined area 710, the processor 340 may generate an enlarged graph 720 obtained by enlarging the predetermined area 710. The generated enlarged graph 720 may be output through the display 330. The enlarged graph 720 may be output separately from the inspection result graph 700, or may be output on the inspection result graph 700 so as to overlap the same.

FIG. 8 illustrates an inspection result graph 800 indicating a result of determination whether the defect has occurred and a result of determination review according to an embodiment of the disclosure. According to a plurality of embodiments, the inspection result graph 800 in FIG. 8 may be generated by the processor 340, and may be output through the display 330 in FIG. 3. According to an embodiment, the inspection result graph 800 in FIG. 8 may be generated in response to reception of an input for selecting any one of inspection result data (e.g., the inspection result data 460) from the inspection result list 400 in FIG. 4 through the user input device 320.

The inspection result graph 800 includes a curve 810 indicating the number of inspection objects having corresponding error values and a reference value GUI 820 indicating a reference value used for determination whether the defect has occurred of the inspection object. As illustrated in FIG. 8, 330 inspection objects having error values equal to or less than a first reference value "d" are determined to have no defect and thereby determined to be "good", and 129 inspection objects having error values between a value "e" and a value "f", which are greater than the first reference value "d", are determined to have a defect and thereby determined to be "defective". In this case, although 25 inspection objects having error values between a value "b" and a value "c", among the 330 inspection objects determined to have no defect, are determined to be "good", since the 25 inspection objects are out of a natural error distribution pattern of a given process (from zero to the value "a"), they may actually have a defect due to some problems other than the given process. Thus, the 25 inspection objects between the value "b" and the value "c" may be determined to have the first error (escape).

Although problems in the process, which cause the abnormal error values between the value "e" and the value "f", are solved, if the first reference value is maintained to be the value "d", error values will be naturally distributed between zero and the value "a" in the normal process. Thus, if products continue to be produced using the process, a significant number of products produced subsequently will continue to have the error values below the first reference value "d", and will be determined to have no defect and thereby determined to be "good" despite the products actually having defects. That is, in the example illustrated in FIG. 8, if the production process itself is not erroneous, the first reference value for determining to have no defect or to have a defect may be regarded as being set to be too loose without reflecting the characteristics of the natural error distribution in the production process.

The inspection result graph 800 may include a candidate reference value indicator 830 indicating a candidate reference value to minimize the number of inspection objects in which determination error has occurred. The candidate reference value may be a candidate for a reference value, which minimizes the number of inspection objects (e.g., 0) determined to be "error", and may be selected from the range of error values between the value "a" and the value "b". Although the candidate reference value indicator 830 is denoted by a dot in FIG. 8, it is not limited thereto, and the candidate reference value indicator 830 may be displayed in any of various forms such as an arrow, a line, and a square. In addition, although a single candidate reference value indicator 830 is displayed in FIG. 8, it is not limited thereto, and a plurality of candidate reference value indicators 830 may be displayed, or the candidate reference value indicator 830 may be displayed in a range. In addition, although not illustrated in FIG. 8, the inspection result graph 800 according to an embodiment may include a GUI indicating a reference value used for determining the inspection object corresponding to "warning", among the inspection objects determined to be "good", and an indicator indicating error values of any one of the plurality of inspection objects.

FIG. 9 illustrates an inspection result graph 900 in which a reference value is updated according to an embodiment of the disclosure. According to an embodiment, the inspection result graph 900 in FIG. 9 may be obtained from the inspection result graph 800 in FIG. 8 by updating the reference value thereof.

According to an embodiment, the user may update the reference value on the inspection result graph 900 through the user input device 320. For example, the user may drag the reference value GUI 820 to the position of the candidate reference value indicator 830 on the inspection result graph 900 using a mouse as the user input device 320. As another example, the user may touch the position of the candidate reference value indicator 830 on the inspection result graph 900 using a touchpad. As described above, the position of the reference value GUI 820 is shifted on the inspection result graph 900 by a graphical input through the user input device 320. In addition, as the position of the reference value GUI 820 is shifted, the reference value may be updated as well. For example, as illustrated in FIG. 9, the reference value is updated from the value "d" to a value "d'".

According to an embodiment, in response to the shift of the reference value GUI 820, the processor 340 may perform defect occurrence/non-occurrence re-determination for the respective inspection objects based on the updated reference value. The processor 340 may determine each inspection object to have no defect and thereby determine the same to be "good" if the error value of the inspection object is equal to or less than the reference value "d'", and may determine each inspection object to have a defect and thereby determined to be "defective" if the error value of the inspection object exceeds the value "d'". In addition, the processor 340 may identify the inspection object in which a re-determination error has occurred, among the inspection objects.

The result of the defect occurrence/non-occurrence re-determination and the result of the re-determination review may be displayed on the inspection result graph 900. As illustrated in FIG. 9, 305 inspection objects having error values equal to or less than the value "d'" are determined to be "good", and 154 inspection objects having error values exceeding the value "d'" are determined to be "defective". In comparison to the inspection result graph 800 in FIG. 8, the number of inspection objects with errors for determination whether the defect has occurred is reduced from 25 in FIG. 8 to zero in FIG. 9. In other words, the error of determination whether the defect has occurred is minimized by updating the reference value, used as a criterion for determination whether the defect has occurred, of the inspection objects.

FIG. 10 is a flowchart illustrating a method for adjusting a condition of determination whether the defect has occurred for the inspection object according to an embodiment of the disclosure. At least some of the steps illustrated in FIG. 10 may be performed by the configurations illustrated in FIGS. 1 to 3.

First, in step S1000, the inspection apparatus 300 acquires measurement values of a plurality of inspection objects. For example, the measurement device 100 may irradiate the inspection object with light, may receive the light reflected from the inspection object, and may generate image data of the inspection object based on the received light. In addition, the measurement device 100 may generate measurement values of the inspection object by measuring the structure of the inspection object, based on the image data. The inspection apparatus 300 may obtain the measurement values generated by the measurement device 100 through the communication circuit 310.

Next, in step S1010, the processor 340 may perform determination whether the defect has occurred for the respective inspection objects. For example, the processor 340 may determine whether the inspection object is good or defective by determining whether or not the measurement values obtained in step S1000 are within predetermined ranges. The processor 340 may obtain error values between the measurement values and design values of the structure of the inspection object, and may compare the obtained error values with a predetermined reference value. The processor 340 may determine the inspection object having an error value equal to or less than the predetermined reference value or within the reference range to have no defect, and may determine the inspection object having an error value exceeding the predetermined reference value or out of the reference range to have a defect.

Next, in step S1020, the processor 340 identifies the inspection object, in which a determination error has occurred, among the plurality of inspection objects. For example, the processor 340 identifies the inspection object, in which a determination error has occurred, among the plurality of inspection objects, based on the results of determination whether the defect has occurred of the inspection objects obtained in step S1010 and the result of the determination review by the determination review device 140. Here, the determination error includes a first error, in which an inspection object determined to have no defect, is identified to actually have a defect and a second error, in which an inspection object determined to have a defect, is identified to actually have no defect.

According to an embodiment, the determination review device 140 may determine a first error value distribution and a second error value distribution (if any) based on the distribution of the error values of the inspection objects 20, which are measured by the measurement device 100, and may estimate a first error value range and a second error value range (if any) from the first error value distribution and the second error value distribution (if any). In addition, the determination review device 140 may identify the inspection object 20, in which a determination error has occurred, among the inspection objects 20, based on the first error value range and the second error value range (if any). In addition, the processor 340 may receive the result of the determination review from the determination review device 140, and may identify the inspection object 20, in which the determination error has occurred.

In step S1030, the processor 340 outputs inspection result graph. For example, the processor 340 generates an inspection result graph indicating the number of inspection objects according to error values. The inspection result graph may be a two-dimensional graph in which the horizontal axis indicates error values and the vertical axis indicates the number of inspection objects having corresponding error values, among the plurality of inspection objects. The processor 340 may display, on the inspection result graph, a GUI object having a bar shape, which is movable by manipulation of a user, as a reference value. In addition, the processor 340 may display "good", "warning", and "defective" as the result of the determination whether the defect has occurred on the inspection result graph. In addition, the processor 340 may display the review result of the determination whether the defect has occurred on the inspection result graph. In addition, the processor 340 may determine at least one candidate reference value to minimize the number of one or more inspection objects, in which the determination error has occurred, and may display the same on the inspection result graph.

According to an embodiment, the candidate reference value may be determined based on the first error value range and the second error value range (if any), which are estimated in step S1020. If the second error value range is provided, the candidate reference value may be selected from among values equal to or greater than the maximum value of the first error value range and equal to or less than the minimum value of the second error value range. If no second error value range is provided, the candidate reference value may be selected from among values equal to or greater than the maximum value of the first error value range.

In step S1040, the processor 340 updates the reference value according to a graphical input on the inspection result graph. The user may provide a graphical input on the inspection result graph so as to reduce the number of one or more inspection objects in which the determination error has occurred. For example, the user may drag the GUI indicating the reference value to a predetermined position on the inspection result graph 600 using a mouse as the user input device 320. The processor 340 updates the reference value with a predetermined value in response to the graphical input of the user (i.e., an input for moving the GUI indicating the reference value).

In step S1050, the processor 340 performs defect occurrence/non-occurrence re-determination for the respective inspection objects based on the updated reference value. For example, the processor 340 compares the reference value updated in step S1040 with the error values, thereby re-determining whether each of the plurality of inspection objects is good or defective. In addition, the processor 340 identifies the inspection object in which a re-determination error has occurred, among the plurality of inspection objects. In addition, the determination result generation unit 336 displays, on the inspection result graph, the updated reference value and the number of inspection objects in which the re-determination error has occurred.

FIG. 11 is a flowchart illustrating an operating method of an inspection apparatus according to an embodiment of the disclosure.

In step S1110, the processor 340 of the inspection apparatus 120 may compare a reference range set for determination whether the defect has occurred for the inspection object with a measurement value for each of a plurality of inspection objects stored in the memory 350, and may determine whether a defect has occurred in each of a plurality of first inspection objects. For example, the processor 340 may determine that a defect does not occur in at least one inspection object having a measurement value within the reference range among the plurality of first inspection objects. In addition, the processor 340 may determine that a defect has occurred in at least one inspection object having a measurement value out of the reference range among the plurality of first inspection objects. For example, the reference range may be set for each inspection item (e.g., x direction offset, y direction offset, etc.), and may be set based on user input or design information about the inspection object.

In step S1120, the processor 340 may identify, based on results of determination whether the defect has occurred for each of the plurality of inspection objects, a plurality of second inspection objects, in which a first error has occurred, and a plurality of third inspection objects, in which a second error has occurred, among the plurality of first inspection objects based on a result of determination whether the defect has occurred in each of the plurality of the first inspection objects. The first error may occur by determining that a defect has not occurred in an inspection object having a defect and the second error may occur by determining that a defect has occurred in an inspection object having no defect. A method of identifying the plurality of second inspection objects, in which the first error has occurred, and the plurality of third inspection object, in which the second error has occurred, may be the same as the above-described method, and therefore a separate description thereof will be omitted.

In step S1130, the processor 340 may adjust the reference range based on measurement values of the plurality of second inspection objects and measurement values of the plurality of third inspection objects. For example, the processor 340 may adjust at least one of an upper limit and a lower limit of the reference range to determine that a defect has occurred in at least one second inspection object among the plurality of second inspection objects. In addition, the processor 340 may adjust at least one of the upper limit and the lower limit of the reference range to determine that a defect has occurred in at least one second inspection object, and then may further adjust the reference range further using measurement values of the plurality of third inspection objects. A specific method of adjusting the reference range will be described later.

In step S1140, the processor 340 may determine at least one of an occurrence probability of a first error and an occurrence probability of a second error based on the adjusted reference range. A detailed method of determining the occurrence probability of the first error and the occurrence probability of the second error will be described later.

In step S1150, the processor 340 may display, on the display 350, at least one of a graph indicating the result of determination whether the defect has occurred, the adjusted reference range, the occurrence probability of the first error, and the occurrence probability of the second error. A user may determine whether the adjusted reference range is appropriate by confirming the occurrence probability of the first error and the occurrence probability of the second error displayed on the display 350, and may finally determine whether to adjust the reference range.

When a user input requesting application of the adjusted reference range is received, the processor 340 may apply the adjusted reference range for the determination whether the defect has occurred for the inspection object. For example, the processor 340 may apply the adjusted reference range displayed through the display 350 as it is, or may adjust and apply the adjusted reference range once again.

FIG. 12 illustrates a screen 1200 displayed after a reference range is adjusted by an inspection apparatus according to an embodiment of the disclosure.

According to the disclosure, the processor 340 of the inspection apparatus 120 may adjust the reference range, and then may display a screen 1200 including a graph 1210 indicating a result of determination whether the defect has occurred, an adjusted reference range 1220, an occurrence probability 1231 of a first error, and an occurrence probability 1232 of a second error through the display 350.

A user may confirm the occurrence probability 1231 of the first error and the occurrence probability 1232 of the second error as well as the result of determination whether the defect has occurred through the screen 1200, thereby determining whether the adjusted reference range 1220 is appropriate based on the result of determination whether the defect has occurred.

In addition, the processor 340 may further include, on the screen 1200, information related to the determination whether the defect has occurred such as the reference range 1240 used in the determination whether the defect has occurred, an average (not shown) of measurement values of the plurality of second inspection objects, an average 1250 of measurement values of the plurality of third inspection objects, and the like in order to provide the user with the information related to determination whether the defect has occurred, and may display the corresponding information through the display 350. However, this is only for the purpose of description and the disclosure is not limited thereto. The processor 340 may further include various pieces of information related to determination whether the defect has occurred on the screen 1200 and may display the corresponding information through the display 350.

FIGS. 13A to 13D are diagrams illustrating a method of adjusting a reference range according to an embodiment of the disclosure.

The processor 340 of the inspection apparatus 120 may adjust at least one of an upper limit value 1311 and a lower limit value 1312 of the reference range so that a defect is determined to occur in at least one second inspection object among the plurality of second inspection objects having the first error. The first error is an error occurring when the plurality of second inspection objects are determined to have no defect according to the set reference range even though the plurality of second inspection objects actually have defects. In order to reduce the first error, the processor 340 may adjust at least one of the upper limit value 1311 and the lower limit value 1312 of the reference range so that the measurement value of the at least one second inspection object among the plurality of second inspection objects is out of the reference range.

Figure 13A:
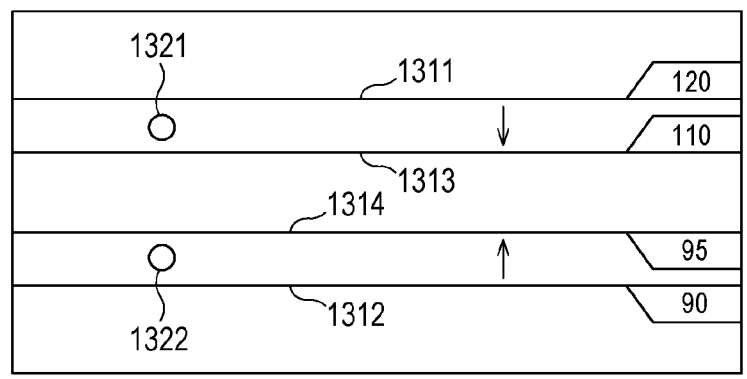
FIGS. 13A to 13D are diagrams illustrating a method of adjusting a reference range according to an embodiment of the disclosure.

As shown in FIG. 13A, when there are a second inspection object 1321, of which the measurement value exists within a predetermined range based on the upper limit value 1311 of the reference range, and a second inspection object 1322, of which the measurement value exists within a predetermined range based on the lower limit value 1312 of the reference range, the processor 340 may determine to adjust both the upper limit value 1311 and the lower limit value 1312 of the reference range to determine that a defect has occurred in the second inspection objects 1321 and 1322. The processor 340 may reduce the upper limit value 1311 of the reference range based on the measurement value of the second inspection object 1321, and may increase the lower limit value 1312 of the reference range based on the measurement value of the second inspection object 1322. The upper limit value 1313 of the adjusted reference range may be smaller than the measurement value of the second inspection object 1321, and the lower limit value 1314 of the adjusted reference range may be greater than the measurement value of the second inspection object 1322. That is, by adjusting the reference range from 90-120 to 95-110, the measurement values of the second inspection objects 1321 and 1322 may be out of the adjusted reference range 95 to 110. Therefore, the processor 340 may determine that a defect has occurred in the second inspection objects 1321 and 1322 based on the adjusted reference range, thereby reducing the occurrence of the first error. The degree of adjustment of the upper limit value 1311 and the lower limit value 1312 of the reference range may be determined based on the measurement values of the second inspection objects 1321 and 1322.

Figure 13B:
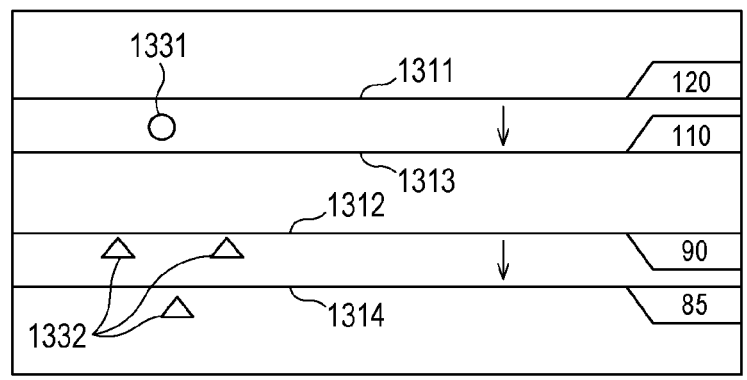

Referring to FIG. 13B, when there is only a second inspection object 1331, of which the measurement value exists within a predetermined range based on the upper limit value 1311 of the reference range, among the plurality of second inspection objects and there is no second inspection object, of which the measurement value exists within a predetermined range based on the lower limit value 1321 of the reference range, the processor 340 may adjust only the upper limit value 1311 of the reference range to determine that a defect has occurred in the second inspection object 1331. The processor 340 may reduce the upper limit value 1311 of the reference range based on the measurement value of the second inspection object 1331. The upper limit value 1313 of the adjusted reference range may be smaller than the measurement value of the second inspection object 1331. That is, by adjusting the reference range from 90-120 to 90-110, the measurement value of the second inspection object 1331 may be out of the reference range 90 to 110, in which only the upper limit value 1311 is adjusted. Therefore, the processor 340 may determine that a defect has occurred in the second inspection object 1331 based on the reference range in which only the upper limit value 1311 is adjusted, thereby reducing the occurrence of the first error. The degree of adjustment of the upper limit value 1311 of the reference range may be determined based on the measurement value of the second inspection object 1331.

In addition, when only the upper limit value 1311 of the reference range is adjusted to determine that a defect has occurred in at least one second inspection object among the plurality of second inspection objects, the processor 340 may identify at least one fourth inspection object 1332 having the measurement value less than the lower limit value 1312 of the reference range among the plurality of third inspection objects having second errors. The processor 340 may determine whether a median value of the at least one fourth inspection object 1332 is included in the reference range 90-110, where only the upper limit value 1311 is adjusted. If the median value of the at least one fourth inspection object 1332 is not included in the reference range 90 to 110 where only the upper limit value 1311 is adjusted, as shown in FIG. 13B, the processor 340 may adjust the lower limit value 1312 of the reference range so that the median value of the at least one fourth inspection object 1332 is included in the reference range. The adjusted lower limit value 1314 of the reference range may be smaller than the median value of the at least one fourth inspection object 1332. That is, since the adjusted reference range 85-110 includes the median value of the at least one fourth inspection object 1332, the number of the plurality of third inspection objects having the second error may be reduced. The degree of adjustment of the lower limit value 1312 of the reference range may be determined based on at least one of the median value and measurement value of the at least one fourth inspection object 1332.

Figure 13C:
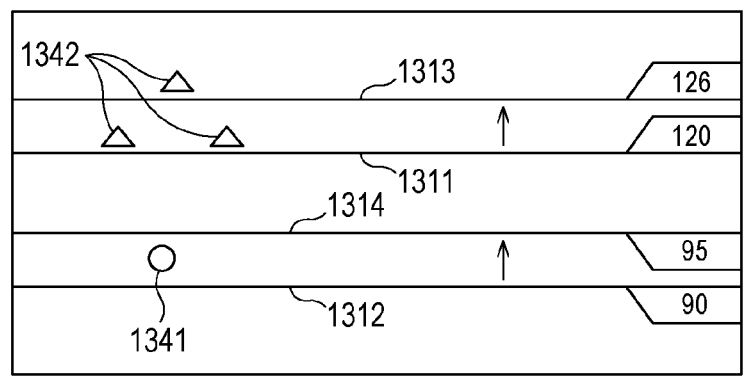

As shown in FIG. 13C, when there is only a second inspection object 1341, of which the measurement value exists within a predetermined range based on the lower limit value 1312 of the reference range, among the plurality of second inspection objects and there is no second inspection object, of which the measurement value exists within the predetermined range based on the upper limit value 1311 of the reference range, the processor 340 may determine to adjust only the lower limit value 1312 of the reference range to determine that a defect has occurred in the second inspection object 1341. The processor 340 may increase the lower limit value 1312 based on the measurement value of the second inspection object 1341. The adjusted lower limit value 1314 of the reference range may be greater than the measurement value of the second inspection object 1341. That is, by adjusting the reference range from 90-120 to 95-120, the measurement value of the second inspection object 1341 may be out of the range of 95 to 120 where only the lower limit value 1312 is adjusted. Therefore, the processor 340 may determine that a defect has occurred in the second inspection object 1341 based on the reference range in which only the lower limit value 1312 is adjusted, thereby reducing the occurrence of the first error. The degree of adjustment of the lower limit value 1312 of the reference range may be determined based on the measurement value of the second inspection object 1341.

In addition, when only the lower limit value 1312 of the reference range is adjusted to determine that a defect has occurred in at least one second inspection object among the plurality of second inspection objects, the processor 340 may identify at least one fifth inspection object 1342 having the measurement value exceeding the upper limit 1311 of the reference range, among the plurality of third inspection objects having the second error. The processor 340 may determine whether the median value of the at least one fifth inspection object 1342 is included in the reference range 95-120 where only the lower limit value 1312 is adjusted. When the median value of the at least one fifth inspector 1342 is not included in the reference range 95-120 where only the lower limit value 1312 is adjusted as shown in FIG. 13C, the processor 340 may adjust the upper limit 1311 of the reference range so that the median value of the at least one fifth inspection object 1342 is included in the reference range. The adjusted upper limit value 1313 of the reference range may be larger than the median value of the at least one fifth inspection object 1342. That is, since the adjusted reference range 95-126 includes the median value of the at least one fifth inspector 1342, the number of the plurality of third inspection objects having the second error may be reduced. The degree of adjustment of the upper limit value 1311 of the reference range may be determined based on at least one of the median value and the measurement value of the at least one fifth inspection object 1342.

Figure 13D:
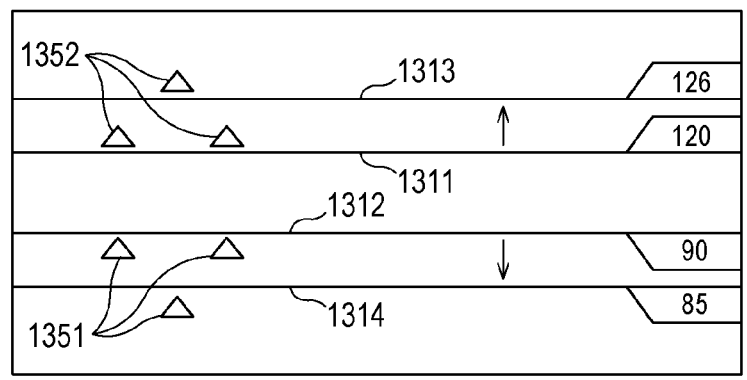

As shown in FIG. 13D, a plurality of second inspection objects having the first error may not exist, or the second inspection objects of which the measurement value exists within a predetermined range based on each of the upper limit value 1311 and the lower limit value 1312 of the reference range may not exist among the plurality of second inspection objects. In this case, the processor 340 may identify at least one fourth inspection object 1351 having the measurement value less than the lower limit value 1312 of the reference range and at least one fifth inspection object 1352 having the measurement value exceeding the upper limit value 1311 of the reference range, among the plurality of third inspection objects having the second error. The processor 340 may determine whether the median value of the at least one fourth inspection object 1351 and the median value of the at least one fifth inspection object 1352 are included in the reference range of 90 to 120. When the median value of the at least one fourth inspection object 1351 and the median value of the at least one fifth inspection object 1352 are not included in the reference range as illustrated in FIG. 13D, the processor 340 may adjust the upper limit value 1311 and the lower limit value 1312 of the reference range so that the median value of the at least one fourth inspection object 1351 and the median value of the at least one fifth inspection object 1352 are included in the reference range. The adjusted upper limit value 1313 of the reference range may be larger than the median value of the at least one fifth inspection object 1352, and the adjusted lower limit value 1314 of the reference range may be smaller than the median value of the at least one fourth inspection object 1351. That is, since the adjusted reference range 85 to 126 includes the median value of the at least one fourth inspection object 1351 and the median value of the at least one fifth inspection object 1352, the number of the plurality of third inspection objects having the second error may be reduced. The degree of adjustment of the upper limit value 1311 and the lower limit value 1312 of the reference range may be determined based on at least one of the median value and the measurement value of the at least one fourth inspection object 1351 and at least one of the median value and the measurement value of the at least one fifth inspection object 1352.

Figure 14:
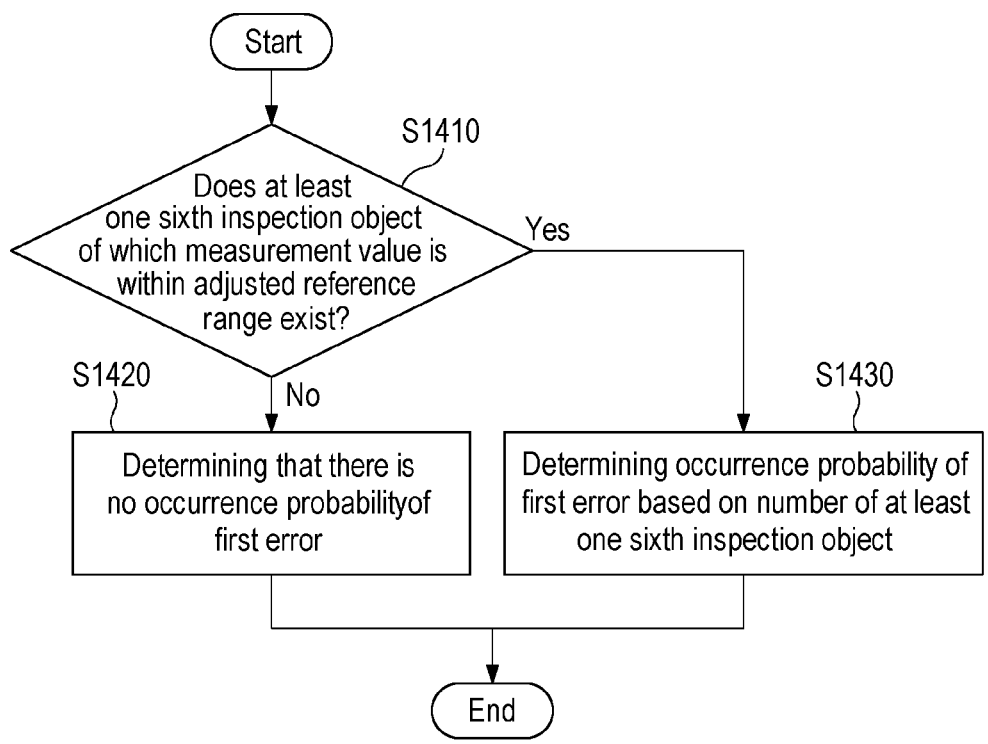
FIG. 14 is a flowchart illustrating a method of determining an occurrence probability of a first error according to an embodiment of the disclosure.

FIG. 14 is a flowchart illustrating a method of determining an occurrence probability of a first error according to an embodiment of the disclosure.

In step S1410, the processor 340 of the inspection apparatus 120 may determine whether there is at least one sixth inspection object, of which the measurement value is within an adjusted reference range, among a plurality of second inspection objects.

In step S1420, when there is no at least one sixth inspection object, the processor 340 may determine that there is no occurrence probability of the first error. In step S1430, when the at least one sixth inspection object is present, the processor 340 may determine an occurrence probability of the first error based on the number of the at least one sixth inspection objects. For example, the processor 340 may determine the occurrence probability of the first error by using a ratio of the number of the at least one sixth inspection object to the number of the first inspection objects to be inspected.

Figure 15:
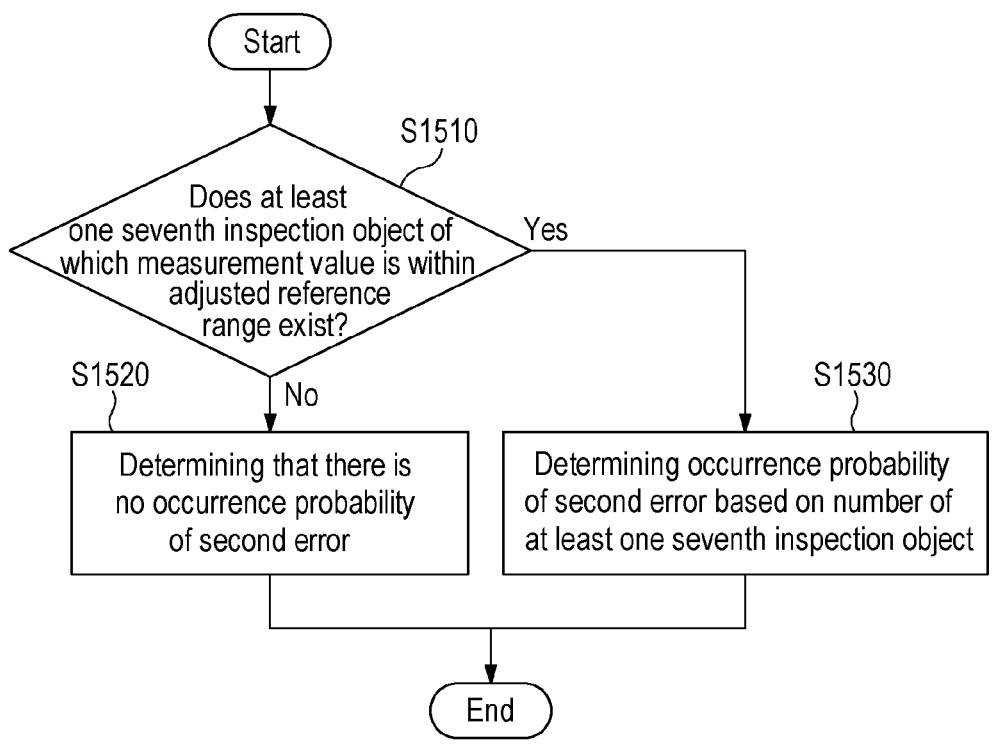
FIG. 15 is a flowchart illustrating a method of determining an occurrence probability of a second error according to an embodiment of the disclosure.

FIG. 15 is a flowchart illustrating a method of determining an occurrence probability of a second error according to an embodiment of the disclosure.

In step S1510, the processor 340 of the inspection apparatus 120 may determine whether there is at least one seventh inspection object, of which the measurement value is within an adjusted reference range, among a plurality of third inspection objects.

In step 1520, when there is no at least one seventh inspection object, the processor 340 may determine no occurrence probability of the second error. In step S1530, when there is the at least one seventh inspection object, the processor 340 may determine the occurrence probability of the second error based on the number of the at least one seventh inspection object. For example, the processor 340 may determine the occurrence probability of the second error by using a ratio of the number of the at least one seventh inspection object to the number of the first inspection objects to be inspected.

Although the method has been described through specific embodiments, the method may also be implemented as a computer-readable code on a computer-readable recording medium. The computer-readable recording medium includes all kinds of recording devices in which data is stored which can be read by a computer system. Examples of computer-readable recording media may include ROM, RAM, CD-ROM, magnetic tape, floppy disk, optical data storage, and the like. The computer-readable recording medium can also be distributed over network coupled computer systems so that the computer readable code is stored and executed in a distributed fashion. In addition, functional programs, codes, and code segments for implementing the above embodiments can be easily inferred by programmers in the art to which the present disclosure belongs.

Although the technical spirit of the present disclosure has been described with reference to some embodiments and the examples shown in the accompanying drawings, the technical spirit and scope of the present disclosure can be understood by those skilled in the art. It will be appreciated that various substitutions, modifications, and changes can be made without departing from the scope of the invention. Also, such substitutions, modifications and variations are intended to be included within the scope of the appended claims.

What is claimed is:
1. An inspection apparatus comprising:
a memory configured to store a measurement value of each of a plurality of first inspection objects;
a display; and
a processor,
wherein the processor
determines whether a defect has occurred in each of the plurality of first inspection objects by comparing a reference range set for determining whether a defect has occurred for an inspection object with the measurement value of each of the plurality of first inspection objects stored in the memory;
identifies a plurality of second inspection objects in which a first error has occurred and a plurality of third inspection objects in which a second error has occurred, among the plurality of first inspection objects based on a result of determination whether the defect has occurred in each of the plurality of the first inspection objects, the first error occurring by determining that a defect has not occurred in an inspection object having a defect and the second error occurring by determining that a defect has occurred in an inspection object having no defect;
adjusts the reference range based on measurement values of the plurality of second inspection objects and measurement values of the plurality of third inspection objects;
determines at least one of an occurrence probability of the first error and an occurrence probability of the second error based on the adjusted reference range;
displays, on the display, at least one of a graph indicating the result of determination whether the defect has occurred in each of the plurality of the first inspection objects, the adjusted reference range, the determined occurrence probability of the first error, and the determined occurrence probability of the second error;

determines whether at least one sixth inspection object, of which the measurement value is within the adjusted reference range, among the plurality of second inspection objects exists;

determines that there is no occurrence probability of the first error, when the at least one sixth inspection object does not exist; and determines the occurrence probability of the first error based on the number of the at least one sixth inspection object, when the at least one sixth inspection object exists.

2. The inspection apparatus of claim 1, wherein the processor:

determines that the defect has not occurred in at least one inspection object, of which the measurement value is within the reference range, among the plurality of first inspection objects, and determines that the defect has occurred in at least one inspection object, of which the measurement value is out of the reference range, among the plurality of first inspection objects.

3. The inspection apparatus of claim 1, wherein the processor adjusts at least one of an upper limit value and a lower limit value of the reference range to determine that the defect has occurred in at least one second inspection object among the plurality of second inspection objects.

4. The inspection apparatus of claim 3, wherein the processor:

identifies at least one fourth inspection object, of which the measurement value is less than the lower limit value of the reference range, among the plurality of third inspection objects, when only the upper limit value of the reference range is adjusted to determine that the defect has occurred in the at least one second inspection object, determines whether a median value of the at least one fourth inspection object is included in the reference range, in which only the upper limit value is adjusted, and adjusts the lower limit value of the reference range so that the median value of the at least one fourth inspection object is included in the reference range, when the median value of the at least one fourth inspection object is not included in the reference range, in which only the upper limit value is adjusted.

5. The inspection apparatus of claim 3, wherein the processor:

identifies at least one fifth inspection object, of which the measurement value exceeds the upper limit value of the reference range, among the plurality of third inspection objects, when only the lower limit value of the reference range is adjusted to determine that the defect has occurred in the at least one second inspection object, determines whether a median value of the at least one fifth inspection object is included in the reference range, in which only the lower limit value is adjusted, and adjusts the upper limit value of the reference range so that the median value of the at least one fifth inspection object is included in the reference range, when the median value of the at least one fifth inspection object is not included in the reference range, in which only the lower limit value is adjusted.

6. An inspection apparatus comprising:
a memory configured to store a measurement value of each of a plurality of first inspection objects;
a display; and
a processor, wherein the processor:

determines whether a defect has occurred in each of the plurality of first inspection objects by comparing a reference range set for determining whether a defect has occurred for an inspection object with the measurement value of each of the plurality of first inspection objects stored in the memory;

identifies a plurality of second inspection objects in which a first error has occurred and a plurality of third inspection objects in which a second error has occurred, among the plurality of first inspection objects based on a result of determination whether the defect has occurred in each of the plurality of the first inspection objects, the first error occurring by determining that a defect has not occurred in an inspection object having a defect and the second error occurring by determining that a defect has occurred in an inspection object having no defect;

adjusts the reference range based on measurement values of the plurality of second inspection objects and measurement values of the plurality of third inspection objects;

determines at least one of an occurrence probability of the first error and an occurrence probability of the second error based on the adjusted reference range;

displays, on the display, at least one of a graph indicating the result of determination whether the defect has occurred in each of the plurality of the first inspection objects, the adjusted reference range, the determined occurrence probability of the first error, and the determined occurrence probability of the second error;

determines whether at least one seventh inspection object, of which the measurement value is out of the adjusted reference range, among the plurality of third inspection objects exists;

determines that there is no occurrence probability of the second error, when the at least one seventh inspection object does not exist; and determines the occurrence probability of the second error based on the number of the at least one seventh inspection object, when the at least one seventh inspection object exists.

7. The inspection apparatus of claim 1, wherein the processor applies the adjusted reference range for determining whether the defect has occurred for an inspection object, when a user input requesting application of the adjusted reference range is received.

8. An operating method of an inspection apparatus comprising:

determining whether a defect has occurred in each of a plurality of first inspection objects by comparing a reference range set for determining whether a defect has occurred for an inspection object with a measurement value of each of the plurality of first inspection objects;

identifying a plurality of second inspection objects in which a first error has occurred and a plurality of third inspection objects in which a second error has occurred, among the plurality of first inspection objects based on a result of determination whether the defect has occurred in each of the plurality of the first inspection objects, the first error occurring by determining that a defect has not occurred in an inspection object having a defect and the second error occurring by determining that a defect has occurred in an inspection object having no defect;

adjusting the reference range based on measurement values of the plurality of second inspection objects and measurement values of the plurality of third inspection objects;
determining at least one of an occurrence probability of the first error and an occurrence probability of the second error based on the adjusted reference range; and
displaying at least one of a graph indicating the result of determination whether the defect has occurred in each of the plurality of the first inspection objects, the adjusted reference range, the occurrence probability of the first error, and the occurrence probability of the second error,
wherein the determining at least one of the occurrence probability of the first error and the occurrence probability of the second error comprises:
determining whether at least one sixth inspection object, which the measurement value is within the adjusted reference range, among the plurality of second inspection objects exists;
determining that there is no occurrence probability of the first error, when the at least one sixth inspection object does not exist; and
determining the occurrence probability of the first error based on the number of the at least one sixth inspection object, when the at least one sixth inspection object exists.

9. The operating method of the inspection apparatus of claim 8, wherein the determining whether the defect has occurred in each of the plurality of first inspection objects comprises:
determining that the defect has not occurred in at least one inspection object, of which the measurement value is within the reference range, among the plurality of first inspection objects, and
determining that the defect has occurred in at least one inspection object, of which the measurement value is out of the reference range, among the plurality of first inspection objects.

10. The operating method of the inspection apparatus of claim 8, wherein the adjusting the reference range comprises:
adjusting at least one of an upper limit value and a lower limit value of the reference range to determine that the defect has occurred in at least one second inspection object among the plurality of second inspection objects.

11. The operating method of the inspection apparatus of claim 10, wherein the adjusting the reference range comprises:
identifying at least one fourth inspection object, of which the measurement value is less than the lower limit value of the reference range, among the plurality of third inspection objects when only the upper limit value of the reference range is adjusted to determine that the defect has occurred in the at least one second inspection object,
determining whether a median value of the at least one fourth inspection object is included in the reference range, in which only the upper limit value is adjusted, and
adjusting the lower limit value of the reference range so that the median value of the at least one fourth inspection object is included in the reference range, when the median value of the at least one fourth inspection object is not included in the reference range in which only the upper limit value is adjusted.

12. The operating method of the inspection apparatus of claim 10, wherein the adjusting the reference range comprises:
identifying at least one fifth inspection object, of which the measurement value exceeds the upper limit value of the reference range, among the plurality of third inspection objects, when only the lower limit value of the reference range is adjusted to determine that the defect has occurred in the at least one second inspection object,
determining whether a median value of the at least one fifth inspection object is included in the reference range, in which only the lower limit value is adjusted, and
adjusting the upper limit value of the reference range so that the median value of the at least one fifth inspection object is included in the reference range, when the median value of the at least one fifth inspection object is not included in the reference range, in which only the lower limit value is adjusted.

13. The operating method of the inspection apparatus of claim 8, further comprising:
applying the adjusted reference range for determining whether the defect has occurred for an inspection object, when a user input requesting application of the adjusted reference range is received.

14. An operating method of an inspection apparatus comprising:
determining whether a defect has occurred in each of a plurality of first inspection objects by comparing a reference range set for determining whether a defect has occurred for an inspection object with a measurement value of each of the plurality of first inspection objects;
identifying a plurality of second inspection objects in which a first error has occurred and a plurality of third inspection objects in which a second error has occurred, among the plurality of first inspection objects based on a result of determination whether the defect has occurred in each of the plurality of the first inspection objects, the first error occurring by determining that a defect has not occurred in an inspection object having a defect and the second error occurring by determining that a defect has occurred in an inspection object having no defect;
adjusting the reference range based on measurement values of the plurality of second inspection objects and measurement values of the plurality of third inspection objects;
determining at least one of an occurrence probability of the first error and an occurrence probability of the second error based on the adjusted reference range; and
displaying at least one of a graph indicating the result of determination whether the defect has occurred in each of the plurality of the first inspection objects, the adjusted reference range, the occurrence probability of the first error, and the occurrence probability of the second error,
wherein the determining at least one of the occurrence probability of the first error and the occurrence probability of the second error comprises:
determining whether at least one seventh inspection object, of which the measurement value is out of the adjusted reference range, among the plurality of third inspection objects exists;

determining that there is no occurrence probability of the second error when the at least one seventh inspection object does not exist; and determining the occurrence probability of the second error based on the number of the at least one seventh inspection object, when the at least one seventh inspection object exists.

15. A method for determining a quality of an inspection object in a quality determination device, the method comprising:

acquiring measurement values for structures of a plurality of inspection objects;

calculating an error value for each of the plurality of inspection objects by comparing the measurement values for structures of the plurality of inspection objects with design values for the structures of the plurality of inspection objects, respectively;

determining whether each of the plurality of inspection objects is good or defective by comparing error values with a reference value which is used for determining whether each of the plurality of inspection objects is good or defective;

identifying one or more inspection objects in which a determination error has occurred, among the plurality of inspection objects, the determination error comprising a first error in which an inspection object determined to be good is identified to be defective and a second error in which an inspection object determined to be defective is identified to be good;

determining at least one candidate reference value to minimize the number of the one or more inspection objects in which the determination error has occurred, based on a first measurement value of at least one inspection object determined to be good and a second measurement value of at least one inspection object determined to be defective; and displaying a graph indicating a result of determining non-defectiveness or defectiveness for each of the plurality of inspection objects, the graph including the reference value and the at least one candidate reference value, wherein the determining the at least one candidate reference value comprises determining the at least one candidate reference value to minimize the number of the one or more inspection objects in which the determination error has occurred, based on a distribution of the calculated error values for each of the plurality of inspection objects.

16. A device for determining a quality of an inspection object, the device comprising:

a database configured to store measurement values for structures of a plurality of inspection objects and design values for the structures of the plurality of inspection objects; and a processor, wherein the processor is configured to:

acquire the measurement values for structures of the plurality of inspection objects stored in the database;

calculate an error value for each of the plurality of inspection objects by comparing the measurement values for structures of the plurality of inspection objects with design values for the structures of the plurality of inspection objects, respectively;

determine whether each of the plurality of inspection objects is good or defective by comparing error values with a reference value which is used for determining whether each of the plurality of inspection objects is good or defective;

identify one or more inspection objects in which a determination error has occurred, among the plurality of inspection objects, the determination error comprising a first error in which an inspection object determined to be good is identified to be defective and a second error in which an inspection object determined to be defective is identified to be good;

determine at least one candidate reference value to minimize the number of the one or more inspection objects in which the determination error has occurred, based on a first measurement value of at least one inspection object determined to be good and a second measurement value of at least one inspection object determined to be defective; and display a graph indicating a result of determining non-defectiveness or defectiveness for each of the plurality of inspection objects, the graph including the reference value and the at least one candidate reference value, wherein the processor is configured to determine the at least one candidate reference value to minimize the number of the one or more inspection objects in which the determination error has occurred, based on a distribution of the calculated error values for each of the plurality of inspection objects.

* * * * *